United States Patent
Winzell

(10) Patent No.: US 12,216,658 B2
(45) Date of Patent: Feb. 4, 2025

(54) DYNAMIC WEIGHT GENERATION FOR SIGNAL SET MATCHING

(71) Applicant: Volvo Car Corporation, Gothenburg (SE)

(72) Inventor: Peter Winzell, Mountain View, CA (US)

(73) Assignee: Volvo Car Corporation, Gothenburg (SE)

(*) Notice: Subject to any disclaimer, the term of this patent is extended or adjusted under 35 U.S.C. 154(b) by 0 days.

(21) Appl. No.: 18/317,610

(22) Filed: May 15, 2023

(65) Prior Publication Data

US 2024/0386019 A1  Nov. 21, 2024

(51) Int. Cl.
*G06F 16/2455* (2019.01)
*G06F 16/2453* (2019.01)

(52) U.S. Cl.
CPC .. *G06F 16/24558* (2019.01); *G06F 16/24537* (2019.01); *G06F 16/24542* (2019.01)

(58) Field of Classification Search
None
See application file for complete search history.

(56) References Cited

U.S. PATENT DOCUMENTS

| | | | | |
|---|---|---|---|---|
| 6,353,827 B1* | 3/2002 | Davies | .................. | G06F 16/313 |
| | | | | 707/E17.084 |
| 2015/0242407 A1* | 8/2015 | Frohock | .................. | G06F 16/21 |
| | | | | 707/749 |
| 2017/0301031 A1* | 10/2017 | Naqvi | .................... | G06Q 40/08 |
| 2018/0204132 A1* | 7/2018 | Liang | ........................ | G06T 7/75 |
| 2018/0260823 A1* | 9/2018 | Lindauer | ................ | G06Q 30/02 |
| 2020/0401580 A1* | 12/2020 | Fitzpatrick | ........ | G06F 16/24578 |
| 2023/0186076 A1* | 6/2023 | Noh | ........................ | G06N 3/047 |
| | | | | 706/15 |
| 2024/0028646 A1* | 1/2024 | Ramsl | ................. | G06F 16/9024 |

OTHER PUBLICATIONS

Winzell, et al "Ideas for vehicle signal set matching" COVESA, Sep. 26, 2022, 11 pages.
"Vehicle Signal Specification" https://covesa.github.io/vehicle_signal_specification/, Last Accessed May 5, 2023, 63 pages.

* cited by examiner

*Primary Examiner* — Christopher J Raab
(74) *Attorney, Agent, or Firm* — Amin, Turocy & Watson, LLP

(57) ABSTRACT

Various systems and methods are presented regarding mapping attributes in a first dataset with attributes in a second dataset. Rather than simply applying a static approach of matching a first attribute in the first dataset with a first attribute in the second dataset, etc., an importance of a particular attribute can be identified to assist in accurate matching versus another attribute that does not have as much importance in the matching process. For example, a DESCRIPTION attribute can have greater importance than a DATATYPE attribute, e.g., as a function of the number of terms available to be matched in a DESCRIPTION than in a DATATYPE field. By identifying the degree of matching of an important attribute, the matched values of lesser important parameters can be dynamically adjusted based on the degree of matching of the important attribute. Such an approach enables vast amounts of datasets to be automatically matched.

20 Claims, 12 Drawing Sheets

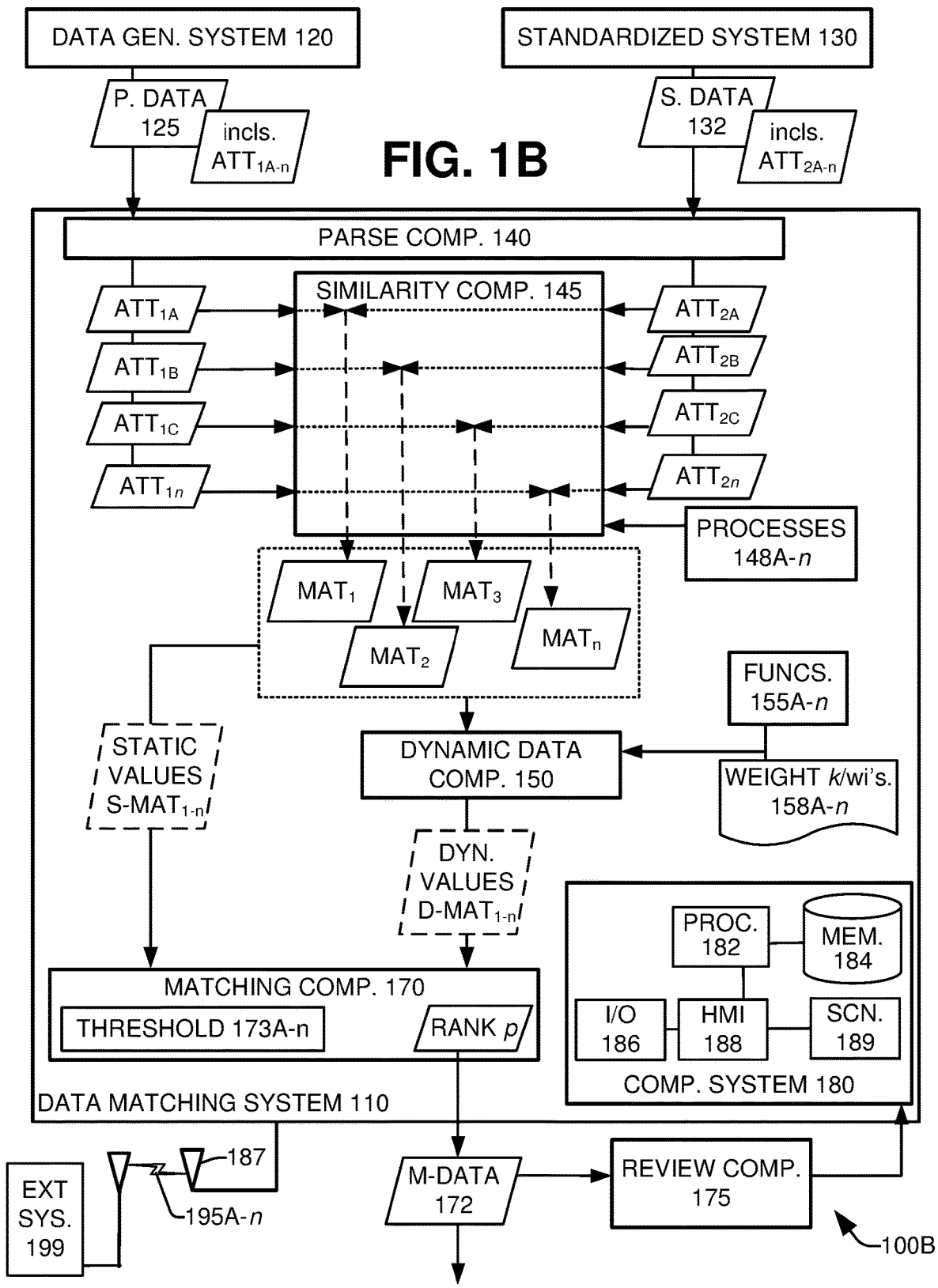

Let $U = \{A, B\}$ where $A = \{S_1, ..., S_n\}$ for PROPRIETARY ATTRIBUTES ATT1A-$n$ and $B = \{S'_1, ..., S'_m\}$ for STANDARD ATTRIBUTES ATT2A-$n$

*Find a mapping* $M: A^L \cup A \cap B$
$M \ni G = (A, B, E)$ *is a bipartite graph:*

| | Vehicle signal comparison | Is Equal | Fd | Wd | Pd | Fu | Wu | k | Pu |
|---|---|---|---|---|---|---|---|---|---|
| 1 | Vehicle.Enhine.Speed vs WinWipgAutCmdIf, rpm | N | 0.4 | 0.9 | 0.36 | 0.99 | 0.45 | 0.5 | 0.4455 |
| 2 | Vehicle.Engine.Speed vs EngSpdDisp, rpm | Y | 0.9 | 0.9 | 0.81 | 0.99 | 0.45 | 0.5 | 0.4455 |
| 3 | Vehicle.Enhine.Speed vs WinWipgAutCmdIf, rpm | N | 0.4 | 0.9 | 0.36 | 0.99 | 0.45 | 0.25 | 0.4455 |
| 4 | Vehicle.Engine.Speed vs EngSpdDisp, rpm | Y | 0.9 | 0.9 | 0.81 | 0.99 | 0.45 | 0.25 | 0.4455 |
| 5 | Vehicle.Enhine.Speed vs WinWipgAutCmdIf, rpm | N | 0.4 | 0.9 | 0.36 | 0.99 | 0.45 | 0.1 | 0.4455 |
| 6 | Vehicle.Engine.Speed vs EngSpdDisp, rpm | Y | 0.9 | 0.9 | 0.81 | 0.99 | 0.45 | 0.1 | 0.4455 |
| 7 | Vehicle.Engine.Speed vs EngSpdDisp, rpm | Y | 1 | 0.9 | 0.9 | 0.99 | 0.45 | 0.1 | 0.4455 |
| 8 | Vehicle.Enhine.Speed vs WinWipgAutCmdIf, rpm | N | 0.4 | 0.9 | 0.36 | 0.99 | 0.45 | 0.1 | 0.4455 |

← 400C

FIRST FUNCTION $$\omega_u = 2 \times \left( \frac{1}{1 + e^{\frac{k \cdot x}{x}}} \right)$$

FIG. 4C

| | Pu | Wu=Fdyn(Pd) | DynamicPu Score | DynamicPu Score | Dynscore | Delta Static weight | Delta Dyna Score |
|---|---|---|---|---|---|---|---|
| 1 | 0.4455 | 0.156636161 | 0.156650698 | 0.40275 | 0.2575349 | | |
| 2 | 0.4455 | 0.657925573 | 0.651134632 | 0.62775 | 0.730673159 | 0.225 | 0.473138 |
| 3 | 0.4455 | 0.05166543 | 0.05114878 | 0.40275 | 0.205574388 | | |
| 4 | 0.4455 | 0.516206951 | 0.51104488 | 0.62775 | 0.660522441 | 0.225 | 0.454948 |
| 5 | 0.4455 | 0.001194337 | 0.00118239 | 0.40275 | 0.180591197 | | |
| 6 | 0.4455 | 0.210775728 | 0.20866797 | 0.62775 | 0.509333986 | 0.225 | 0.328743 |
| 7 | 0.4455 | 0.483727736 | 0.478890046 | 0.672705 | 0.689400229 | | |
| 8 | 0.4455 | 0.001194337 | 0.00118239 | 0.40275 | 0.180591197 | 0.18059 | |

| | Vehicle signal comparision | Is Equal | Fd | Wd | Pd | Fu | Wu | k | Pu |
|---|---|---|---|---|---|---|---|---|---|
| 1 | Vehicle.Engine.Speed vs WinWipgAutCmdIf, rpm | N | 0.40 | 0.90 | 0.36 | 0.99 | 0.45 | 1.00 | 0.45 |
| 2 | Vehicle.Engine.Speed vs EngSpdDisp, rpm | Y | 0.90 | 0.90 | 0.81 | 0.99 | 0.45 | 1.00 | 0.45 |
| 3 | Vehicle.Engine.Speed vs WinWipgAutCmdIf, rpm | N | 0.40 | 0.90 | 0.36 | 0.99 | 0.45 | 5.00 | 0.45 |
| 4 | Vehicle.Engine.Speed vs EngSpdDisp, rpm | Y | 0.90 | 0.90 | 0.81 | 0.99 | 0.45 | 5.00 | 0.45 |
| 5 | Vehicle.Engine.Speed vs WinWipgAutCmdIf, rpm | N | 0.40 | 0.90 | 0.36 | 0.99 | 0.45 | 10.00 | 0.45 |
| 6 | Vehicle.Engine.Speed vs EngSpdDisp, rpm | Y | 0.90 | 0.90 | 0.81 | 0.99 | 0.45 | 10.00 | 0.45 |
| 7 | Vehicle.Engine.Speed vs EngSpdDisp, rpm | Y | 1.00 | 0.90 | 0.90 | 0.99 | 0.45 | 40.00 | 0.45 |
| 8 | Vehicle.Engine.Speed vs WinWipgAutCmdIf, rpm | N | 0.40 | 0.90 | 0.36 | 0.99 | 0.45 | 40.00 | 0.45 |

$$\omega_u = \left( \frac{1}{1 + e^{-k(1-\frac{1}{p})}} \right)$$

SECOND FUNCTION

| | Pu | Fdyn(Pd) | Wu= Dyn.Pu | Score | Dynscore | Delta Static weight | Delta Dyna Score |
|---|---|---|---|---|---|---|---|
| 1 | 0.45 | 0.47 | 0.46 | 0.40 | 0.41 | | |
| 2 | 0.45 | 0.58 | 0.57 | 0.63 | 0.69 | 0.23 | 0.28 |
| 3 | 0.45 | 0.33 | 0.33 | 0.40 | 0.34 | | |
| 4 | 0.45 | 0.82 | 0.82 | 0.63 | 0.81 | 0.23 | 0.47 |
| 5 | 0.45 | 0.20 | 0.20 | 0.40 | 0.28 | | |
| 6 | 0.45 | 0.96 | 0.95 | 0.63 | 0.88 | 0.23 | 0.60 |
| 7 | 0.45 | 1.00 | 0.99 | 0.67 | 0.94 | | |
| 8 | 0.45 | 0.00 | 0.00 | 0.40 | 0.18 | 0.18 | |

THIRD FUNCTION $W_u = x$

DYNAMIC WEIGHT GENERATION FOR SIGNAL SET MATCHING

TECHNICAL FIELD

The present disclosure generally relates to converting proprietary data signals to a standardized naming system, for example, an open standard naming.

BACKGROUND

Digital technology and signaling is ubiquitous in the modern world, with a multitude of sensors and monitoring systems generating a wealth of data across the globe. Typically original equipment manufacturers (OEMs) use proprietary nomenclature and identifiers, wherein the OEM nomenclature may not match with nomenclature provided in a standardized system(s). For example, autonomous vehicles can have a plethora of onboard sensors and monitoring systems generating a wealth of data signals and data. In an aspect, OEM engineers may prefer to not disclose a source, sensor type, data type, etc., that generated a dataset. However, to enable further review/collaboration regarding the dataset, the dataset can be named in accordance with a standard system, e.g., the Vehicle Signal Specification (VSS) developed by the Connected Vehicle Systems Alliance (COVESA). Translation of proprietary named data to an open standard such as the VSS can promote innovation across the vehicle manufacturing industry while also automatically hiding proprietary signal details. However, matching proprietary named data (e.g., vehicle signal sets), translation, and mapping from a first signal set (e.g., signal set A) to a second signal set (e.g., signal set B) requires manually mapping the signal sets, which can be both time consuming and tedious, particularly when an extensive number of signal sets are to be translated.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

In one or more embodiments described herein, systems, devices, computer-implemented methods, methods, apparatus and/or computer program products are presented to automatically determine whether a first dataset matches with a second dataset.

According to one or more embodiments, a system can be located on a vehicle, The system can comprise a memory that stores computer executable components and a processor that executes the computer executable components stored in the memory. The computer executable components can comprise a data matching component configured to determine a degree of matching between a first dataset and a second data set, wherein the degree of matching is based on a similarity of two or more attributes in the first dataset with two or more attributes in the second dataset, wherein the two or more attributes in the first dataset are known. In another embodiment, the computer executable components can further comprise comprising a parsing component configured to identify, in the two or more attributes in the first dataset, a first attribute having the most importance and a second attribute having the least importance, wherein, the most important first attribute indicates high confidence in the determination of degree of matching between the first dataset and the second dataset, and the least important second attribute indicates low confidence in the determination of degree of matching between the first dataset and the second dataset.

In a further embodiment, the computer executable components can further comprise a similarity component configured to identify, in the two or more attributes in the second dataset, a first attribute in the second dataset having at least one of a number of terms or form of terms similar to the first attribute in the first dataset, and further determine a first degree of similarity between the first attribute in the second dataset with the first attribute in the first dataset. In another embodiment, the similarity component can be further configured to a similarity component configured to identify, in the two or more attributes in the second dataset, a first attribute in the second dataset having at least one of a number of terms or form of terms similar to the first attribute in the first dataset, and further determine a first degree of similarity between the first attribute in the second dataset with the first attribute in the first dataset. In another embodiment, the similarity component can be further configured to identify, in the two or more attributes in the second dataset, a second attribute in the second dataset having at least one of a number of terms or form of terms similar to the second attribute in the first dataset, and determine a second degree of similarity between the second attribute in the second dataset with the second attribute in the first dataset.

In another embodiment, the computer executable components can further comprise a dynamic data component configured to apply the second degree of similarity to the first degree of similarity to dynamically adjust the first degree of similarity as a function of the second degree of similarity.

In another embodiment, the computer executable components can further comprise a matching component configured to combine the adjusted first degree of similarity to the second degree of similarity to generate a match value between the first dataset and the second dataset. The matching component can be further configured to compare the match value with a threshold and in the event of the match value is below the threshold indicate the first dataset and second dataset do not match. Further, in the event of the match value is above the threshold, the matching component can be further configured to indicate the first dataset and second dataset match.

In an embodiment, the first attribute can include a greater number of terms than the second attribute. In another embodiment, the first attribute is a DESCRIPTION and the second attribute is UNIT. In a further embodiment, the first attribute can be a multi-valued attribute and the second attribute can be a single value attribute. In a further embodiment, the two or more attributes in the first dataset can be named in accordance with a standardized naming convention and the two or more attributes in the second dataset can be named in accordance with a proprietary naming convention.

In other embodiments, elements described in connection with the disclosed systems can be embodied in different forms such as computer-implemented methods, computer program products, or other forms. For example, in an embodiment, a computer-implemented method can be performed by a device comprising a processor to determine a degree of matching between a first dataset and a second data set, wherein the degree of matching can be based on a similarity of two or more attributes in the first dataset with two or more attributes in the second dataset, wherein the two or more attributes in the first dataset are known.

In another embodiment, the method can further comprise identifying, by the device, in the two or more attributes in the first dataset, a first attribute having the most importance and a second attribute having the least importance, wherein the most important first attribute indicates high confidence in the determination of degree of matching between the first dataset and the second dataset and the least important second attribute indicates low confidence in the determination of degree of matching between the first dataset and the second dataset.

In another embodiment, the method can further comprise (i) identifying, by the device, in the two or more attributes in the second dataset, a first attribute in the second dataset having at least one of a number of terms or form of terms similar to the first attribute in the first dataset, (ii) determining, by the device, a first degree of similarity between the first attribute in the second dataset with the first attribute in the first dataset, (iii), identifying, by the device, in the two or more attributes in the second dataset, a second attribute in the second dataset having at least one of a number of terms or form of terms similar to the second attribute in the first dataset, and/or (iv) determining, by the device, a second degree of similarity between the second attribute in the second dataset with the second attribute in the first dataset.

In another embodiment, the method can further comprise applying, by the device, the second degree of similarity to the first degree of similarity to dynamically adjust the first degree of similarity as a function of the second degree of similarity and further combining, by the device, the adjusted first degree of similarity to the second degree of similarity to generate a match value between the first dataset and the second dataset. The method can further comprise comparing, by the device, the match value with a threshold. The method can further comprise, in the event of the match value is below the threshold, indicating, by the device, the first dataset and second dataset do not match, while in the event of the match value is above the threshold indicating, by the device, the first dataset and second dataset match.

Further embodiments can include a computer program product comprising a computer readable storage medium having program instructions embodied therewith, the program instructions executable by a processor, can cause the processor to determine a degree of matching between a first dataset and a second data set, wherein the degree of matching is based on a similarity of two or more attributes in the first dataset with two or more attributes in the second dataset, wherein the two or more attributes in the first dataset are known.

In another embodiment, the program instructions are further executable by the processor to cause the processor to identify, in the two or more attributes in the first dataset, a first attribute having the most importance and a second attribute having the least importance, wherein: the most important first attribute indicates high confidence in the determination of degree of matching between the first dataset and the second dataset, and the least important second attribute indicates low confidence in the determination of degree of matching between the first dataset and the second dataset. In another embodiment, the program instructions are further executable by the processor to identify in the two or more attributes in the second dataset, a first attribute in the second dataset having at least one of a number of terms or form of terms similar to the first attribute in the first dataset, further determine a first degree of similarity between the first attribute in the second dataset with the first attribute in the first dataset, further identify in the two or more attributes in the second dataset, a second attribute in the second dataset having at least one of a number of terms or form of terms similar to the second attribute in the first dataset, and further determine a second degree of similarity between the second attribute in the second dataset with the second attribute in the first dataset.

In another embodiment, the program instructions are further executable by the processor to apply the second degree of similarity to the first degree of similarity to dynamically adjust the first degree of similarity as a function of the second degree of similarity and further combine the adjusted first degree of similarity to the second degree of similarity to generate a match value between the first dataset and the second dataset; compare the match value with a threshold. In the event of the match value is below the threshold, the program instructions are further executable by the processor to indicate the first dataset and second dataset do not match, and in the event of the match value is above the threshold, the program instructions are further executable by the processor to indicate by the first dataset and second dataset match.

An advantage of the one or more systems, computer-implemented methods, and/or computer program products can be utilizing various systems and technologies located on a vehicle to determine whether an occupant onboard the vehicle approves or disapproves of a soundscape, wherein the soundscape can be generated as a function of noise suppression, noise enhancement, anti-noise, and suchlike.

DESCRIPTION OF THE DRAWINGS

One or more embodiments are described below in the Detailed Description section with reference to the following drawings.

FIG. 1B illustrates a system configured to map a first dataset to a second dataset as a function of one or more dataset attributes, in accordance with at least one embodiment.

FIG. 4C presents data utilized to enable determination of a matching between a first dataset and a second dataset, according to one or more embodiments.

FIG. 5C presents data utilized to enable determination of a matching between a first dataset and a second dataset, according to one or more embodiments.

DETAILED DESCRIPTION

Figure 1A:
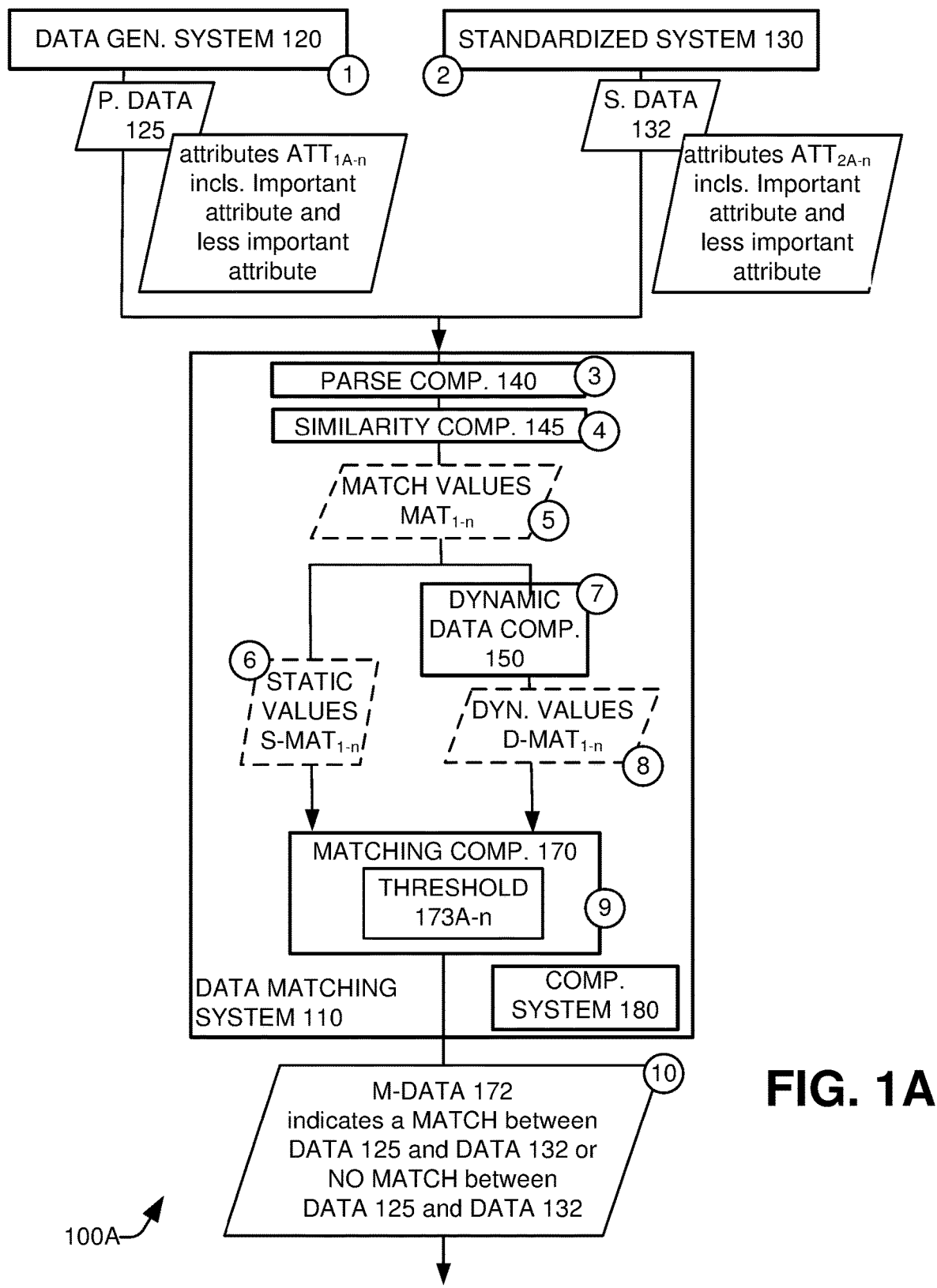
FIG. 1A illustrates a system configured to map a first dataset to a second dataset as a function of one or more dataset attributes, in accordance with at least one embodiment.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

As used herein, "data" can comprise metadata. Further, ranges A-n are utilized herein to indicate a respective plurality of devices, components, signals, datasets, etc., where n is any positive integer.

In the various embodiments presented herein, the disclosed subject matter can be directed to converting/mapping a dataset/signal set generated with a proprietary lexicon to nomenclature utilized by an open standard such as VSS. In an embodiment, signal set mapping of a first dataset having a proprietary naming to a second dataset utilizing open source naming can entail identifying attributes in the first dataset that are also present in the open standard. For example, commonly used signal attributes are NAME, DESCRIPTION, UNIT, and DATATYPE. Hence, identifying data having common units (e.g., velocity) can narrow down the potential dataset matchings from a multitude of datasets (e.g., velocity, pressure, temperature, etc.) to a subset (e.g., velocity). However, during mapping of the first dataset to the second dataset, one type of attribute may be more useful to the overall determination of signal similarity than other attributes. For example, the NAME and DESCRIPTION attributes may provide higher value/context to the mapping process than UNIT and DATATYPE. Accordingly, a weighting system can be utilized to provide a value measure of a first attribute versus a second attribute. Hence, rather than applying a system utilizing static weightings, dynamic functions and attribute weighting(s) can be used to weigh attributes dynamically, and further reflect the value of a comparison based on an attribute having greater importance (e.g., extensive number of terms) than a comparison based on an attribute of lesser value (e.g., single or limited number of terms).

A ranking algorithm can be utilized where the attributes associated with a certain signal are compared to the same attributes in a signal from another set to facilitate signal set mapping. A ranking algorithm can return a score that is used to estimate how well two signals from different sets match or do not match. To calculate a score, a score and a weight for each attribute comparison are presented. In an example embodiment, a dynamic weight function can be defined as a weight function that is increasing in the interval [0 . . . 1]. Per the various embodiments presented herein, it is possible to control a weighting and its significance for the overall similarity of two signals from different signal sets, e.g., comparison of two vehicle signals from different vehicle signal sets, a proprietary dataset versus a standardized dataset, and suchlike.

The various embodiments presented herein enable signal set matching to be automatically performed, enabling signal set mapping to be performed in a rapid, timely manner versus time-consuming and potentially tedious manual matching. The various embodiments presented herein can further enable signal set matching to be performed in-vehicle as well as mapping of recorded data sets in a cloud-based computer system.

Turning now to the drawings, FIG. 1A presents a system overview 100 of a system that can be configured to map a first dataset to a second dataset as a function of one or more dataset attributes, in accordance with at least one embodiment. To aid understanding, FIG. 1A can be read as a sequence of operations (1)-(10) as shown in FIG. 1A.

(1) System 100 comprises a data matching system 110 communicatively coupled to a first system, data generation system 120 and a second system, standardized system 130. In an embodiment, the data generation system 120 can be configured to generate a first dataset, e.g., a proprietary data 125A-n. As shown, the proprietary data 125A-n can comprise various proprietary attributes $ATT_{1A-n}$, as further described, wherein a first attribute can be of high importance/usefulness for dataset matching, and a second attribute can be of lesser importance, as further described. (2) Standardized system 130 can be configured to generate a second dataset, e.g., a standardized data 132A-n, similarly, the standardized data 132A-n can comprise various attributes $ATT_{2A-n}$, as further described, wherein a first attribute in data 132A-n can also be of high importance/usefulness for dataset matching, and a second attribute in data 132A-n can be of lesser importance, as further described.

Data 125A-n and data 132A-n can be parsed (3) by a parse component 140 included in the data matching system 110, to identify and extract the respective attributes $ATT_{1A-n}$ and $ATT_{2A-n}$ from the respective data input. Data matching system 110 can further comprise a similarity component 145 configured to (4) map common attributes $ATT_{1A-n}$ and $ATT_{2A-n}$ in the respective data 125A-n and data 132A-n. (5) Based on the success of mapping, match values $MAT_{1-n}$ can be generated to the respective attributes in $ATT_{1A-n}$ and $ATT_{2A-n}$. For example, a DESCRIPTION attribute may be present in both attributes $ATT_{1A-n}$ and $ATT_{2A-n}$, with a match value $MAT_1$ indicating the determined degree of similarity of the DESCRIPTION attribute in data 125A-n and data 132A-n.

A set of static match values $S\text{-}MAT_{1-n}$ can be generated (6) from the match values MAT1-n, wherein the static match values $S\text{-}MAT_{1-n}$ can be input into a matching component 170, as further described. Also, (7)-(8) a set of dynamic match values $D\text{-}MAT_{1-n}$ can be generated as a function of inputting a set of match values $MAT_{1-n}$ into a dynamic data component 150. During the dynamic generation process, the match value (e.g., $MAT_1$) of the most important attribute in the datasets (e.g., DESCRIPTION) can be applied to weight the match value (e.g., $MAT_2$) of a lesser important attribute in the datasets (e.g., UNIT), such that if a high similarity is found for the most important attribute, the high similarity can be applied to the lesser important attribute to improve ability to match datasets. Conversely, if a low similarity is found for the most important attribute, the low similarity can be applied to the lesser important attribute to lower the match value of the lesser important attribute, which can again improve ability to identify a dissimilar dataset.

The static match values $S\text{-}MAT_1\text{-}n$ and the dynamic match values $D\text{-}MAT_{1-n}$ can be input into (9) to a matching component 170 located in the data matching system 110, wherein, based on a comparison between the $S\text{-}MAT_{1-n}$ and $D\text{-}MAT_{1-n}$ values a determination of the similarity or dissimilarity of the datasets 125 and 132 can be obtained. In an embodiment, in the event of a match value is above a threshold 173A-n, the datasets 125 and 132 can be deemed to be similar, and in the event of a match value is below a threshold 173A-n, the datasets 125 and 132 can be deemed to be dissimilar. As shown, (10) match data, e.g., M-DATA 172, can be generated and transmitted by the data matching system 110, wherein M-DATA 172 can also include an indication of a match/similarity between data 125 and 132, and also an indication of no match/dissimilarity between data 125 and 132.

In an embodiment, as further described, two datasets (e.g., datasets 125 and 132) can be input into a data matching system 110, and based on the various components and functions presented herein, a set of match values M-DATA 172 can be automatically generated indicating the degree of match between the two datasets with a higher degree of confidence than can be achieved by a matching system that utilizes only static match values. As shown, a computer system 180 can be included in the data matching system 110 to facilitate the various embodiments presented herein, as further described.

FIG. 1B presents further detail of system 100 that can be utilized to map a first dataset to a second dataset as a function of one or more dataset attributes, in accordance with at least one embodiment. As mentioned, system 100 comprises a data matching system 110 communicatively coupled to a first system, data generation system 120 and a second system, standardized system 130. In an embodiment, the data generation system 120 can comprise of various sensors, devices, etc., configured to monitor operation of respective elements of a system, and further generate one or more datasets, data streams, signal sets, and suchlike. In an embodiment, the respective datasets can be generated in accordance with a proprietary naming regimen, per proprietary data 125A-n, as shown, wherein the proprietary naming regimen can comprise various proprietary attributes $ATT_{1A-n}$, as further described.

As further shown in FIG. 1B, the data matching system 110 can be communicatively coupled to a standardized system 130. The standardized system 130 can be operated by an entity tasked with generating one or more naming standards, such as COVESA. In an embodiment, the standardized system 130 can generate standard attributes $ATT_{2A-n}$ having a standard naming regimen, e.g., an open standard such as VSS. In another embodiment, the standardized system 130 can represent a second data generation system that is generating data having known/identified data attributes $ATT_{2A-n}$.

The data matching system 110 can include a parse component 140 which can be configured to receive proprietary data 125 that includes the attributes $ATT_{1A-n}$ and the standard data 132 that includes the attributes $ATT_{2A-n}$. In an embodiment, the parse component 140 can be configured to parse the proprietary data 125 to identify the proprietary attributes $ATT_{1A-n}$ associated with the proprietary data 125, the parse component 140 can also be configured to parse the standardized data 132 to identify the proprietary attributes $ATT_{2A-n}$ associated with the standardized data 132. For example, the proprietary data 125 and standardized data 132 can comprise any attribute for a particular data of interest. Per the examples presented herein, the attributes $ATT_{1A-n}$ and $ATT_{2A-n}$ can comprise four attributes: (i) NAME, (ii) DESCRIPTION, (iii) UNIT of measure, and (iv) DATATYPE.

To enable an understanding of the various concepts and embodiments presented herein, the following describes a basis of value and weighting for the four attributes with arbitrary naming per FIG. 1B: (i) NAME ($ATT_{1A}/ATT_{2A}$), (ii) DESCRIPTION ($ATT_{1B}/ATT_{2B}$), (iii) UNIT of measure ($ATT_{1C}/ATT_{2C}$), and (iv) DATATYPE ($ATT_{1n}/ATT_{2n}$).

The NAME attribute defines the name of the respective data 125 and 132. The DESCRIPTION attribute typically comprises descriptive text utilized to define the respective data 125 and 132, and typically, the description has the greatest semantic meaning/value of any of the attributes. The UNIT of measure can be a scalar quantity and/or a vector quantity defining a standard of measurement, e.g., time (second, millisecond, etc.), length (meter, feet, etc.), velocity (meter/second, feet/second), mass (kilogram), electric current (ampere), temperature (kelvin, centigrade, Fahrenheit), pressure (pascal, psi), etc. The DATATYPE attribute can be a classification specifying/categorizing the type of variable the respective data 125 and 132 comprises, for example, string, floating value, short data, long data, integer(s), character(s), and suchlike.

Typically, the UNIT and DATATYPE attributes are defined according to a standard, e.g., UNITs of measure conform to the International System of Units (SI), and DATATYPE specified to enable processing of the data, e.g., string, floating point data, etc. However, NAME and DESCRIPTION are not so strictly confined, and rather, may be named in some arbitrary manner, e.g., as defined/conceived by the engineer configuring the data generation system 120. A NAME attribute typically comprises a limited number of alphanumerics, and may often be a concatenation of abbreviations/shorthand for the component being monitored. For example, an engineer at one research center may NAME data obtained from a sensor monitoring a first engine as Vehicle.Engine.Speed, while a second engineer may name comparable data obtained from a second engine as EngSpdDisp. However, while NAME may provide some indication of the content/source of the respective data 125 and 132, the actual identifier utilized is likely arbitrary. Per the example, given revolutions per minute (RPM) is a commonly used UNIT of measure, it is likely that both Vehicle.Engine.Speed data and EngSpdDisp data will have the UNIT of measure as RPM, which has some value as the RPM unit can be utilized to distinguish the Vehicle.Engine.Speed data and EngSpdDisp data from pressure data with UNIT of measure=PSI.

Of the four example attributes, the DESCRIPTION attribute likely has the most value as the engineer can provide a brief description of the data 125, a sensor used to obtain the data, location of the sensor, etc. In an example attribute naming convention, the NAME attribute may comprise of one or more terms, the DESCRIPTION attribute may comprise of numerous/plurality of terms (e.g., multi-valued), the UNIT attribute may comprise of a single term (e.g., a single value identifying the units), and the DATATYPE attribute may comprise of a single term (e.g., a single value identifying the datatype of the specific attribute). Hence, the DESCRIPTION can be a useful source of information, with a high likelihood that any terms provided in the DESCRIPTION are pertinent to the data 125 and/or 132 being captured, as a poorly defined DESCRIPTION can complicate subsequent analysis of the data 125 and/or 132.

However, as previously mentioned the NAME and DESCRIPTION attribute for data 125 may be proprietary. Hence, to enable the data 125 to be shared by a first entity with other entities, by translating the proprietary attributes in data 125 to standard attributes in data 132, the data 125 can be given standard attributes without the proprietary terms having to be released. Further, in a situation where data is to be readily shared between entities, adopting the standard attributes ($ATT_{2A-n}$) of the standardized system 130 enables the data (e.g., data 125) to be shared with an associated context provided by the standard attributes $ATT_{2A-n}$.

Continuing the example further, while the following parameters all have a UNIT attribute of RPM, the UNIT has limited use here as Vehicle.Engine.Speed data and EngSpdDisp data may match (e.g., pertain to similar sensor/component of interest to an engineer), data generated from monitoring a front windshield wiper Win WipeFront does not match Vehicle.Engine.Speed data, as it is likely that an engineer has no interest in comparing engine RPM with the RPM of a windshield wiper.

| NAME #1 | UNIT #1 | NAME #2 | UNIT #2 | MATCH |
|---|---|---|---|---|
| Vehicle.Engine.Speed | RPM | WinWipeFront | RPM | N |
| Vehicle.Engine.Speed | RPM | EngSpdDisp | RPM | Y |

Continuing the above example furthermore, Vehicle.Engine.Speed data can be a proprietary attribute $ATT_{1A}$, while WinWipeFront and EngSpdDisp are included in a set of standard attributes $ATT_{2A}$. As shown below, the DESCRIPTION attribute for the Vehicle.Engine.Speed contains more terms shared with the DESCRIPTION attribute for the EngSpdDisp than for the DESCRIPTION attribute of the Win WipeFront data. Hence, per the examples, it is useful to configure a system that will be able to distinguish/parse (e.g., by parse component 140) the respective attributes, such that Vehicle.Engine.Speed and EngSpdDisp are identified (e.g., by similarity component 145) as being comparable/match (e.g., with a matching value $MAT_2$ tending towards 1) and Vehicle.Engine.Speed and WinWipeFront are identified (e.g., by similarity component t145) as being disjunct/no match (e.g., with a matching value $MAT_2$ tending towards 0).

| NAME | DESCRIPTION | UNIT |
|---|---|---|
| Vehicle.Engine.Speed | Engine speed measured as rotations per minute | RPM |
| Win WipeFront | Distributes information about wiping speed in rpm | RPM |
| EngSpdDisp | Engine speed value for engine speed meter | RPM |

Hence, from the foregoing example, it is apparent that in terms of value to associate and/or distinguish data having a proprietary attribute $ATT_{1A-n}$ with a standard attribute $ATT_{2A-n}$, the following ranking of importance can be determined: 1) DESCRIPTION (highest value/weight), 2) NAME, 3) UNIT, 4) TYPE (lowest value/weight).

As shown in FIG. 1B, the similarity component 145 can generate respective matches $MAT_{1-n}$, wherein (i) $MAT_1$ is the degree of matching between NAME attributes $ATT_{1A}/ATT_{2A}$. (ii) $MAT_2$ is the degree of matching between DESCRIPTION attributes $ATT_{1B}/ATT_{2B}$, (iii) $MAT_3$ is the degree of matching between UNIT of measure attributes $ATT_{1C}/ATT_{2C}$, and (iv) $MAT_4$ is the degree of matching between DATATYPE attributes $ATT_{1n}/ATT_{2n}$.

After the data 125/132 has been parsed, by parse component 140, and the respective attributes $ATT_{1A-n}$ and $ATT_{2A-n}$ extracted, the respective attributes $ATT_{A-n}$ and $ATT_{2A-n}$ can be applied to the similarity component 145. The similarity component 145 can be configured to determine the similarity of content (e.g., number of terms, similar terms) between respective attributes. For example, the similarity component 145 can be configured to determine respective similarity between (i) NAME attributes $ATT_{1A}/ATT_{2A}$, (ii) DESCRIPTION attributes $ATT_{1B}/ATT_{2B}$, (iii) UNIT of measure attributes $ATT_{1C}/ATT_{2C}$, and (iv) DATATYPE attributes $ATT_{1n}/ATT_{2n}$. As previously described, ratings of between 0→1 can be applied for the degree of similarity of each respective attribute. For example, where the DESCRIPTION attributes $ATT_{1B}/ATT_{2B}$ for data 125 and data 132 comprise similar terms/words a similarity/match rating ($MAT_2$) of approaching 1 can be derived by similarity component 145, wherein a rating of 1 could indicate the respective DESCRIPTIONs comprise of a significant number of terms (e.g., 10 terms) and all of the terms are present in both $ATT_{1B}$ and $ATT_{2B}$. Alternatively, a $MAT_2$ rating of 0 could indicate that the number of terms in the respective $ATT_{1B}$ and $ATT_{2B}$ are disparate and/or few or no common terms were identified.

The similarity component 145 can utilize any suitable language/semantics component/processes 148A-n to facilitate a determination of similarity. In an embodiment, the similarity component 145 can further include processes 148A-n respectively developed/configured/trained to determine information, make predictions, classify entities, etc., regarding the proprietary attributes $ATT_{1A-n}$ and the standard attributes $ATT_{2A-n}$ to enable the proprietary attributes $ATT_{1A-n}$ associated with proprietary data 125 to be translated to the standard attributes $ATT_{2A-n}$, whereby the standard attributes $ATT_{2A-n}$ are correctly assigned to/associated with the data 125. Processes 148A-n can be configured to provide artificial intelligence (AI) and/or machine learning (ML) to the similarity component 145 and other components (e.g., dynamic data component 150, matching component 170) included in data matching system 110, enabling the respective determinations, predictions, mappings, associations, etc., to be achieved (e.g., semantics, term/word/language mapping, etc.), per the various embodiments presented herein. Processes 148A-n can be configured to provide determinations/information regarding whether a standard attribute $ATT_{2A-n}$ and data 132 has been correctly assigned (e.g., matches) to the respective proprietary attribute $ATT_{1A-n}$ and data 125.

As previously mentioned, a conventional data matching system can make a determination of the degree of match between proprietary data 125 and standardized data 132 and generate the matches $MAT_{1A-n}$, whereby the values will remain static, with the similarity/matching determination being conducted based on these static values. However, as mentioned, the conventional data matching system does not take into account the importance of one attribute over another attribute, e.g., DESCRIPTION attribute conveying more information/importance than the DATATYPE attribute.

As shown in FIG. 1B, matching values $MAT_{1-n}$ can exist in a static version $S-MAT_{1-n}$, e.g., having the values output by similarity component 145. However, per the various embodiments presented herein, the values $MAT_{1-n}$ can also be inputted into a dynamic data component 150, wherein the dynamic data component 150 can be configured to apply dynamic weighting to the values $MAT_{1-n}$ to generate dynamic values $D-MAT_{1-n}$. The dynamic data component 150 can be configured to utilize various weighting functions f that can have one or more of the matching values $MAT_{1-n}$ applied thereto along with a weight constant k, from which a dynamic match $D-MAT_{1-n}$ is generated to enhance a determination of a match or no-match between the respective attributes $ATT_{1A-n}$ and $ATT_{2A-n}$.

As further described, the dynamic data component 150 can utilize one or more functions 155A-n to supplement the determination of match between the respective attributes $ATT_{1A-n}$ and $ATT_{2A-n}$. In an example embodiment, and as further described, the DESCRIPTION matching value $MAT_2$ can be applied as the variable x for a function f (e.g., any of functions 155A-n), wherein the function 155A-n can further include a weight constant k. The variable x and the constant k enable the significance of a first attribute (e.g., DESCRIPTION attributes $ATT_{1B}/ATT_{2B}$) to dynamically weight the matching between other attributes (e.g., UNIT and DATATYPE attributes, $ATT_{1C}/ATT_{2C}$ and $ATT_{1n}/ATT_{2n}$).

The respective functions 155A-n can be selected based on their respective ability to drive a matching towards 0 when there is no match/minimal match between respective attributes $ATT_{1A-n}$ and $ATT_{2A-n}$ and further to drive a matching towards 1 when there is no match/minimal match between respective attributes $ATT_{1A-n}$ and $ATT_{2A-n}$.

In an embodiment, a determination of matching between datasets 125 and 132 can be based on similarity in values between respective $S-DAT_{1-n}$ and $D-DAT_{1-n}$, e.g., a similarity indicates that the values generated by $S-DAT_{1-n}$ and $D-DAT_{1-n}$ are comparable, and a value $M-DAT_{1-n}$ can be generated therefrom (e.g., $M-DAT_1=(S-DAT_1+D-DAT_1)/2$). Further, a determination p of matching between datasets 125 and 132 can be based on a threshold 173A-n, wherein a value of $M-DAT_{1-n}$ that is below a threshold 1743A-n can indicate no match between datasets 125 and 132, while a value of $M-DAT_{1-n}$ that is above a threshold 173A-n can indicate a match between datasets 125 and 132. For example, utilizing a threshold of 173A=0.5, a value of $M-DAT_1$ of less than 0.5 indicates no matching, and a matching of $M-DAT_1$ equal or above the threshold 0.5 can indicate matching.

To enable understanding, the following presents three different functions being utilized to generate the dynamic values followed by the processes undertaken at the matching component 170. It is to be appreciated that the three functions presented below are examples and any suitable function can be utilized.

A ranking algorithm p (e.g., in matching component 170) that generates a score based on how well two signals match can be described as follows:

$$p = \frac{\sum_{i=1}^{n} f_i w_i}{n}, \text{ where } f_i \in [0, 1] \text{ and } w_i \in [0, 1],$$

where:
$f_i$ is the comparision function,
$w_i$ is the adjusted weight.
n is the number of attribute matching functions (e.g., attributes $ATT_{1A-n}$ and $ATT_{2A-n}$), e.g., n=4 for NAME, DESCRIPTION, UNIT, and DATATYPE attributes.

As previously described, by dynamically modifying the ranking algorithm p a comparison of the UNIT attribute is weighed less than, for example, the textual DESCRIPTION attribute. Utilizing just the static matching weight (e.g., $S-MAT_{1-n}$) associated with an attribute results in an equal score for units that are exact matches, even though the signal datasets 125 and 132 are disjunct. To mitigate this, a weight attribute generator $f_w$ (e.g., in dynamic data component 150 operating in conjunction with functions 155A-n and weights w; 158A-n) is utilized to apply a match value (e.g., $D-MAT_{1-n}$) from what is considered a more important/unique attribute function to generate a weight $w_i \epsilon [0 \ldots 1]$, a weight that can then used to calculate the matching score of a less important attribute. The respective function 155A-n can also be defined to control an increase of the weight $w_i$ as the more important attribute (e.g., DESCRIPTION) score approaches 1.

Definitions of Weight Functions $f_w$, Functions 155A-n.

It is desired to utilize an increasing weight function $f_w$, where $0 < f_w < 1$.

First Example Function $f_1$:
The weight function 155A can be defined as:

$$f_w = g(f_i \cdot w_i) = 2x\left(\frac{1}{1+e\left(\frac{1-x}{k}\right)}\right), x = f_i \cdot w_i, 0 < x < 1, k \in [0.01, 0.5]$$

The selection of constant k enables defining when the weight function approach 1 rapidly. Accordingly, per the various embodiments presented herein, a dynamic signal weight attribute (e.g., $D-MAT_{1-n}$) can be generated where the weight can be dynamically controlled, i.e., how important it is considered the attribute comparison has become related to the starting signal attribute, e.g., $ATT_{1A-n}$ and $ATT_{2A-n}$ respectively in data 125 and data 132.

Figure 4A:
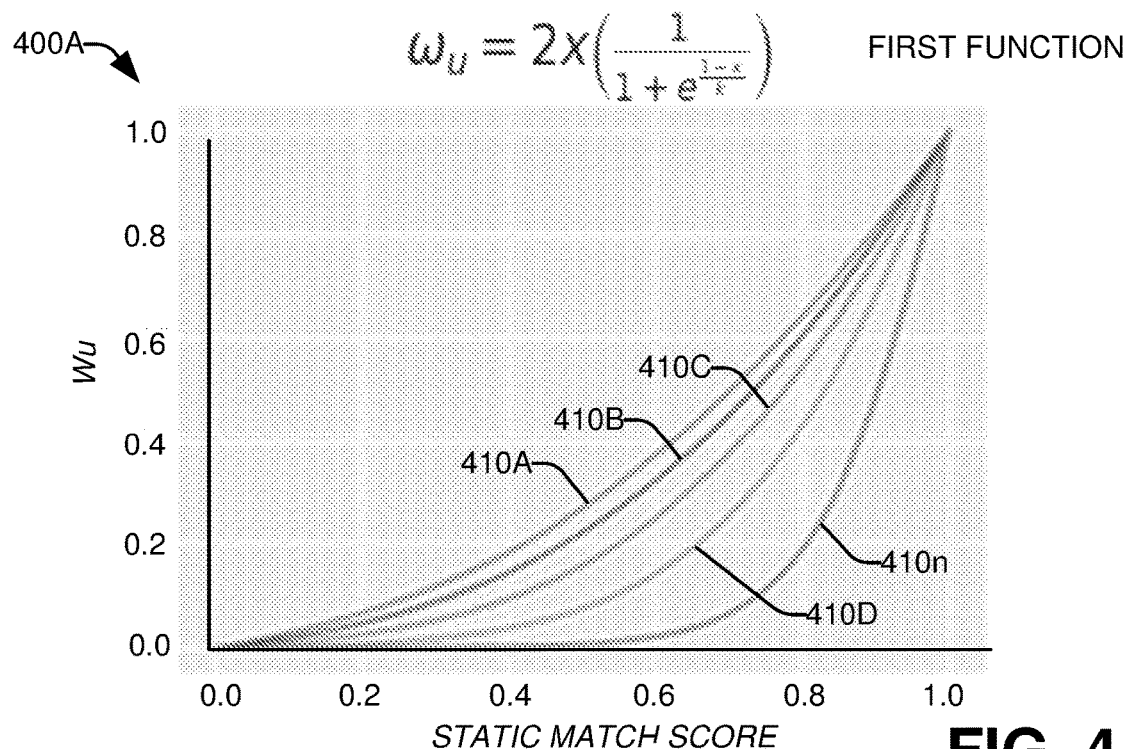
FIG. 4A presents a plot of a function to enable determination of a degree of matching between attributes in a first dataset and attributes in a second dataset, in accordance with an embodiment.
Figure 4B:
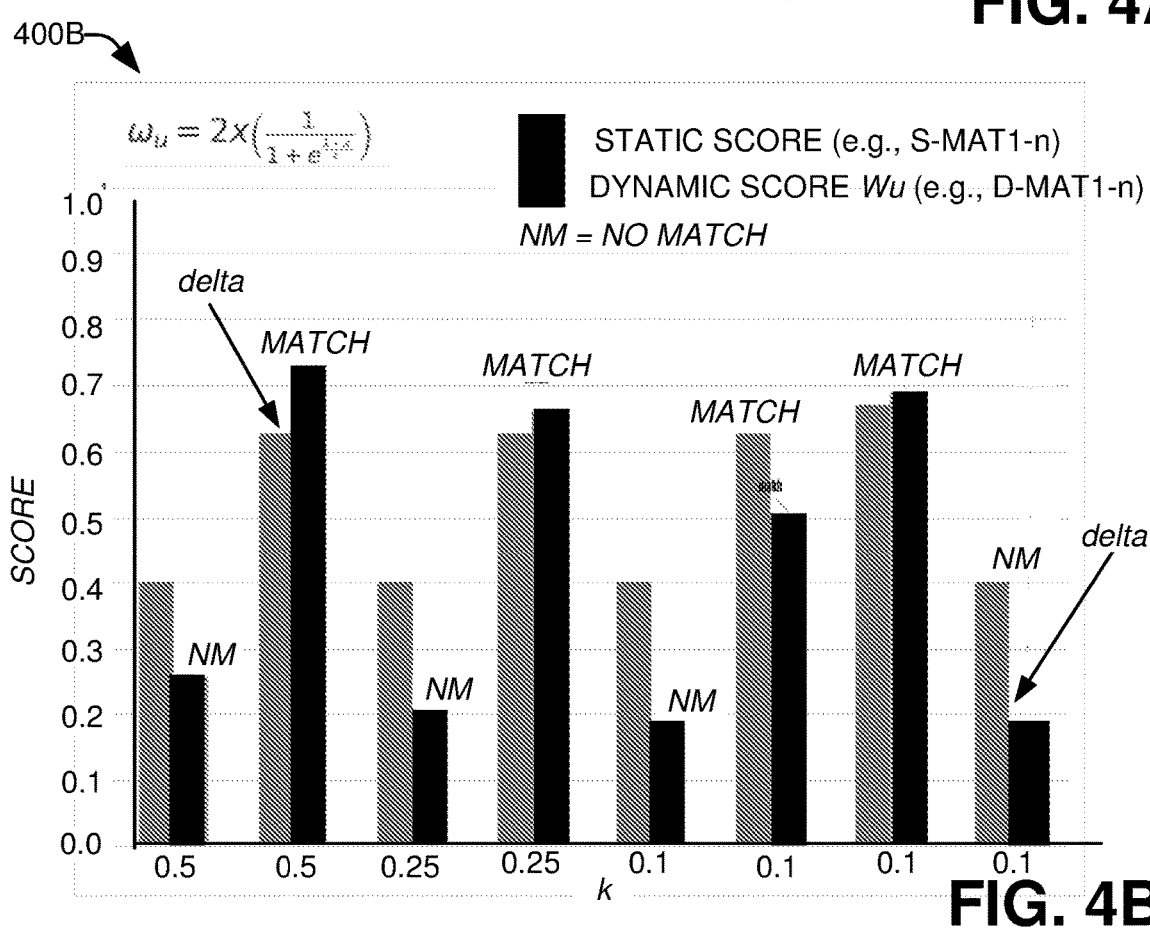
FIG. 4B presents a chart presenting respective static matching scores and dynamic matching scores utilized to determine a degree of match between two datasets, according to one or more embodiments.

Advancing to FIGS. 4A-C, FIGS. 4A-C present data and results utilized by application of a first function to determine a degree of matching between attributes in a first dataset and attributes in a second dataset, in accordance with an embodiment. FIG. 4A presents chart 400A depicting the plot of $w_u$ the first function as a function of the static match score for different weights k. FIG. 4B presents chart 400B presenting respective static matching scores and dynamic matching scores ($w_u$). FIG. 4C presents data 400C utilized during creation and analysis of the data presented in FIG. 4B.

The follow table identifies how the respective parameters presented in FIG. 4C (and similarly FIGS. 5C and 6C) are derived. As shown, an initially derived UNIT attribute is modified by the result of the DESCRIPTION attribute.

TABLE 1

Figure 5A:
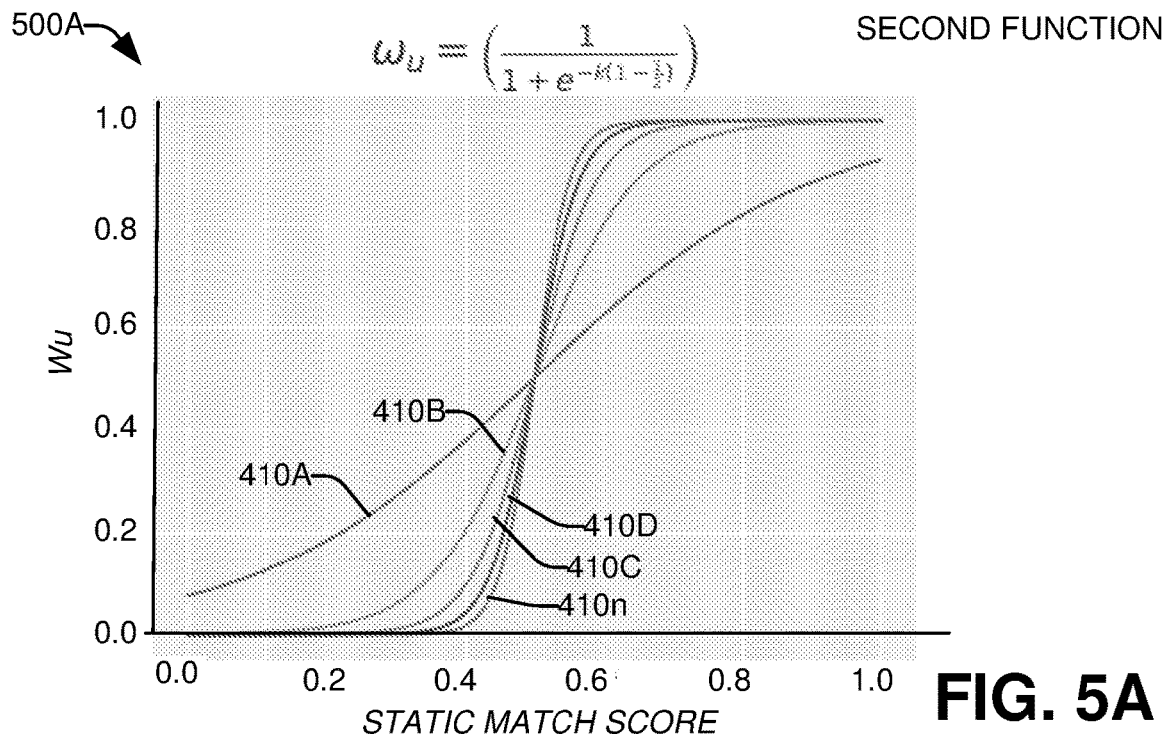
FIG. 5A presents a plot of a function to enable determination of a degree of matching between attributes in a first dataset and attributes in a second dataset, in accordance with an embodiment.
Figure 6A:
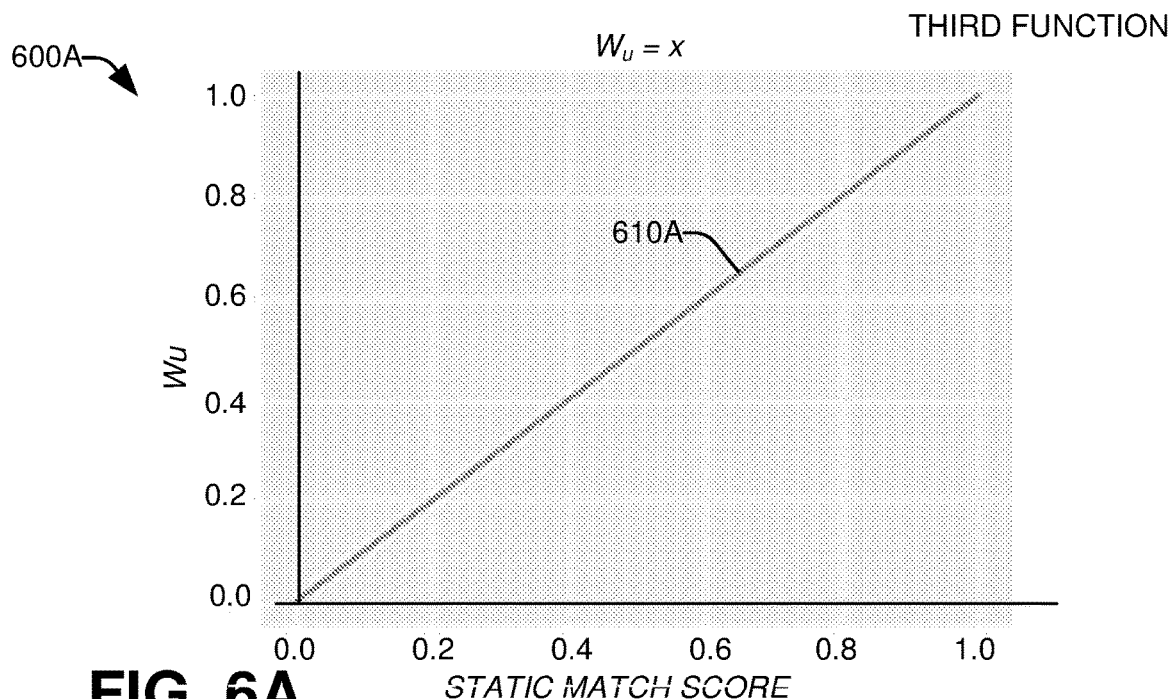
FIG. 6A presents a plot of a function to enable determination of a degree of matching between attributes in a first dataset and attributes in a second dataset, in accordance with an embodiment.
Figure 6B:
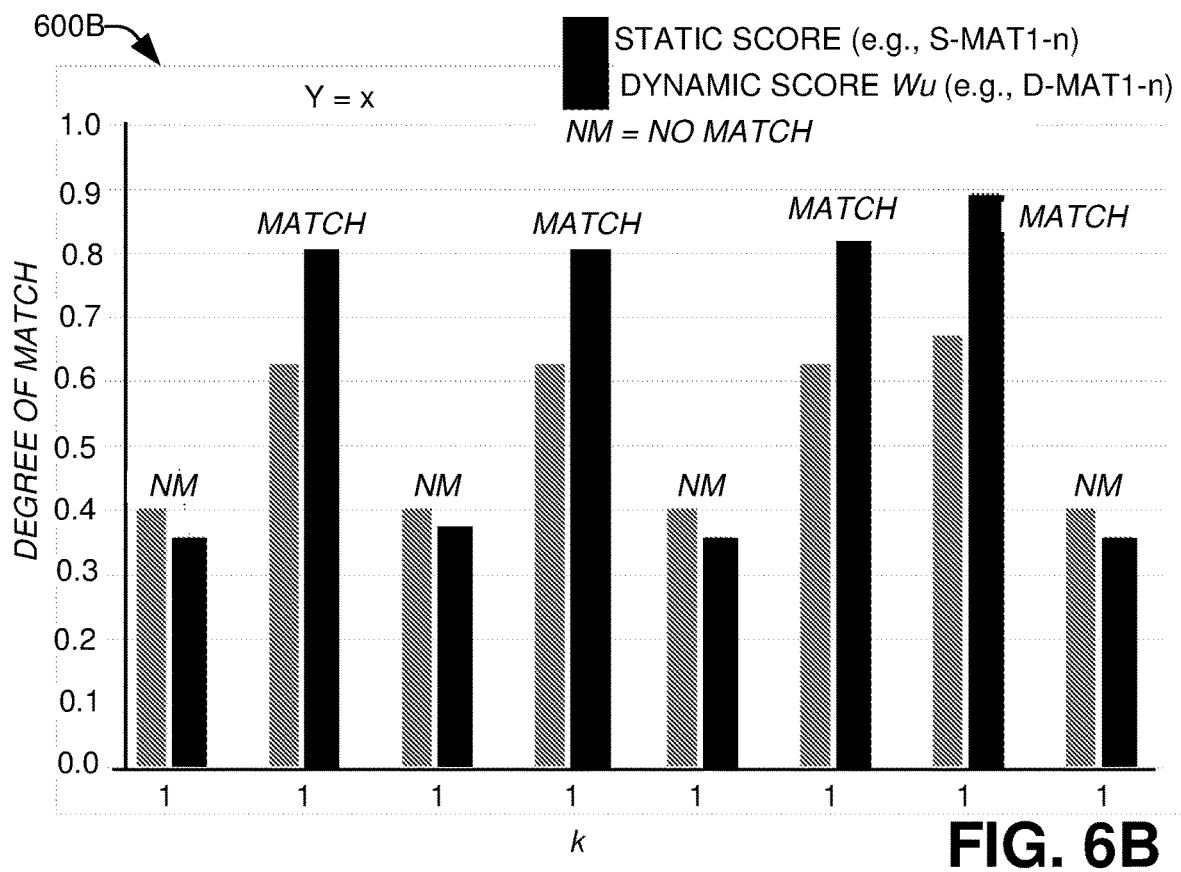
FIG. 6B presents a chart presenting respective static matching scores and dynamic matching scores utilized to determine a degree of match between two datasets, according to one or more embodiments.
Figure 6C:
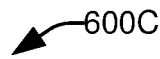
FIG. 6C presents data utilized to enable determination of a matching between a first dataset and a second dataset, according to one or more embodiments.

RESPECTIVE PARAMETERS AND THEIR DERIVATION FOR FIGS. 4C, 5C, and 6C.

| Parameter | Derived | Overview | Static/Dynamic |
|---|---|---|---|
| $F_d$ | | Comparison function for DESCRIPTION attribute | |
| $W_d$ | | Adjusted weight for DESCRIPTION attribute | |
| $P_d$ | $P_d = F_d * W_d$ | Ranking algorithm for DESCRIPTION attribute | |
| $F_u$ | | Comparison function for UNIT attribute | |
| $W_u$ | | Adjusted weight for UNIT attribute | |
| $P_u$ | $P_u = F_u * W_u$ | Ranking algorithm for UNIT attribute | Static value |
| k | | Constant for application to dynamic function algorithm | |
| $W_{ud} = F_{dyn(Pd)}$ | | Major function to dynamically adjust Wu with $P_d$ as input and k | |
| Dynamic $P_u$ | $= F_u * W_{ud}$ | Where $W_u$ is based on the $P_d$ and k | Dynamic value |
| Static Score | $(P_d + P_u)/2$ | | |
| Dynamic Score | $(P_d + DynamicP_u)/2$ | | |
| Delta Static Weight | =score static match − score static no match | | |
| Delta Dynamic Score | =score dynamic match − score dynamic no match | | |

For function $f_1$, given:

$$\lim_{x \to 1} f_w = 2x\left(\frac{1}{1+e^{\left(\frac{1-x}{k}\right)}}\right) = 1$$

$$\lim_{x \to 0} f_w = 2x\left(\frac{1}{1+e^{\left(\frac{1-x}{k}\right)}}\right) = 0$$

Required to prove that $f_w$ is an increasing function in the interval [0,1].

Given: $f_w = g(x) \cdot h(x) = 2x\left(\frac{1}{1+e^{\left(\frac{1-x}{k}\right)}}\right)$, $$g(x) = 2x \text{ and } h(x) = \left(\frac{1}{1+e^{\left(\frac{1-x}{k}\right)}}\right).$$

Showing that the derivative is positive within the interval, it follows that $f_w$ is increasing within the interval.

Figure 5B:
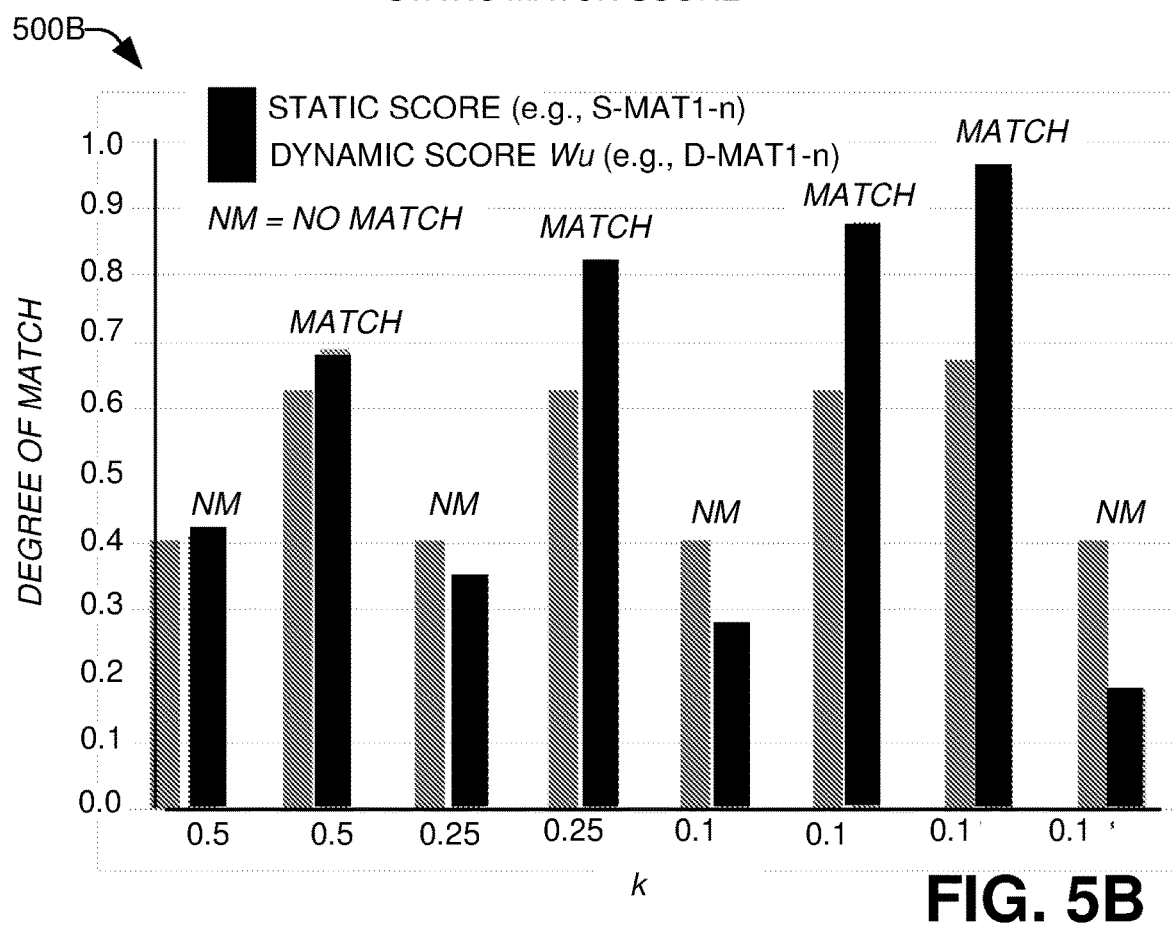
FIG. 5B presents a chart presenting respective static matching scores and dynamic matching scores utilized to determine a degree of match between two datasets, according to one or more embodiments.

$f'(x) =$ $g'(x) \cdot h(x) + g(x) \cdot h'(x) = \frac{dy}{dx}(2x) \cdot \left(\frac{1}{1+e^{\left(\frac{1-x}{k}\right)}}\right) + 2x \cdot \frac{dy}{dx}\left(\left(\frac{1}{1+e^{\left(\frac{1-x}{k}\right)}}\right)\right) \Rightarrow$ $g'(x) = 2,$ $h'(x) = \dfrac{e^{\left(\frac{1-x}{k}\right)}}{k \cdot \left(1+e^{\left(\frac{1-x}{k}\right)}\right)^2}, \Rightarrow$ $f' = 2\left(\dfrac{1}{1+e^{\left(\frac{1-x}{k}\right)}} + \dfrac{xe^{\left(\frac{1-x}{k}\right)}}{k \cdot \left(1+e^{\left(\frac{1-x}{k}\right)}\right)^2}\right)$ $f'(0) = 2 \cdot \left(\dfrac{1}{1+e^{\left(\frac{1}{k}\right)}} + \dfrac{0 \cdot e^{\frac{1}{k}}}{k \cdot \left(1+e^{\frac{1}{k}}\right)^2}\right) = 2 \cdot \left(\dfrac{1}{1+e^{\left(\frac{1}{k}\right)}} + 0\right) > 0,$ $\forall k \in [0.01, 0.5]$ $f'(1) = 2 \cdot \left(\dfrac{1}{1+e^{(0)}} + \dfrac{1 \cdot e^0}{k \cdot (1+e^0)^2}\right) = 2 \cdot \left(\dfrac{1}{2} + \dfrac{1}{4k}\right) > 0, \forall k \in [0.01, 0.5].$ Second Example Function $f_2$:

FIGS. 5A-C present data and results utilized by application of a first function to determine a degree of matching between attributes in a first dataset and attributes in a second dataset, in accordance with an embodiment. FIG. 5A presents chart 500A depicting the plot of $w_u$ the first function as a function of the static match score for different weights k. FIG. 5B presents chart 500B presenting respective static matching scores and dynamic matching scores ($w_u$). FIG. 5C presents data 500C utilized during creation and analysis of the data presented in FIG. 5B.

The weight function 155A can be defined as follows, and is a slightly different function to $f_1$:

$$f(x) = \dfrac{1}{1+e^{-k\left(x-\frac{1}{2}\right)}}, 0 \le x \le 1, k \in [1, 5, 10, 40]$$

As per $f_1$ above, the weight function is defined:

$f_w = g(f_i \cdot w_i)$, where $f_i$ and $w_i$ where $f_i$ and $w_i$ are the weight and the calculated comparison value, e.g., the description function value and its weight in the example.

Hence, setting $x = f_i \cdot w_i$.

$$\lim_{x \to 1} f(x) = \dfrac{1}{1+e^{-k\left(\frac{1}{2}\right)}} = 1 \text{ when } k > \sim 10$$

-continued $$\lim_{x \to 0} f(x) = \frac{1}{1+e^{-k\left(\frac{1}{2}\right)}} = 0 \text{ when } k > \sim 10$$

$$\lim_{x \to \frac{1}{2}} f(x) = \frac{1}{1+e^0} = \frac{1}{2}$$

$$f'(x) = \frac{k \cdot e^{-k\left(x-\frac{1}{2}\right)}}{\left(1+e^{-k\left(x-\frac{1}{2}\right)}\right)^2} > 0 \; \forall \; x \in [0 \ldots 1] k > \sim 10$$

The function is increasing as k is selected per the foregoing.

Third Example Function $f_3$:

FIGS. 6A-C present data and results utilized by application of a first function to determine a degree of matching between attributes in a first dataset and attributes in a second dataset, in accordance with an embodiment. FIG. 6A presents chart 600A depicting the plot of $w_u$ the first function as a function of the static match score for different weights k. FIG. 6B presents chart 600B presenting respective static matching scores and dynamic matching scores ($w_u$). FIG. 6C presents data 600C utilized during creation and analysis of the data presented in FIG. 6B.

$f_3$ is a simpler function compared to the prior two functions $f_1$ and $f_2$ f(x)=k·x, where k=1 and x∈[0 . . . 1]
f'(x)=1>0∀x∈[0 . . . 1]

As shown in FIG. 6A, the result of the third function is a straight line.

Match Delta as a Function Performance Criterion

A match delta criterion can be defined to compare how well the weight generating functions perform. The difference (delta) between matches and no matches is determined. The performance criterion should reflect the requirement of matched attributes generate a high value of matching when utilizing dynamic weights and a low value for when attributes do not match.

$P_c$ is defined as:

$$\Delta_{match} + \Delta_{no\text{-}match} = P_c$$

where $\Delta_{match} = f_{dyn} - f_{static}$
and $\Delta_{no\text{-}match} = f_{static} - f_{dyn}$ The following present examples utilizing various NAME, DESCRIPTION and UNIT attributes (e.g., as previously described) for two signal sets A (e.g., data 125) and B (data 132).

Signal Set A (e.g., data 125):
NAME: Vehicle.Engine.Speed
DESCRIPTION: Engine speed measured as rotations per minute
UNIT: rpm
Signal Set B (e.g., data 132)
NAME: WinWipgAutCmdIf
DESCRIPTION: Distributes information about wiping speed in rpm
UNIT: rpm
NAME: EngSpdDisp
DESCRIPTION: Engine speed value for engine speed meter
UNIT: rpm Per the example, the two signals in signal set B share the same UNIT, but the actual signals are disjunct. The attribute functions for DESCRIPTION and UNIT for these signals are defined as:

$P_d = f_d \cdot w_d$ is the description attribute similarity score,
and: $p_u = f_u \cdot w_u$ is the unit attribute similarity score $$\Rightarrow p = \frac{p_d + p_u}{2}.$$

Utilizing the three previously presented functions:

$$f_1 = 2x\left(\frac{1}{1+e^{\left(\frac{1-x}{k}\right)}}\right)$$

$$f_2 = \frac{1}{1+e^{-k\left(x-\frac{1}{2}\right)}}$$

$$f_3 = kx$$

FIGS. 4B, 5B, and 6B respectively show comparison between signal sets (e.g., signal set data 125 and signal set data 132) that should match and signal sets that should not. FIGS. 4B, 5B, and 6B also present the respective algorithm using static weight and with dynamic generated weights. FIGS. 4B, 5B, and 6B indicate that the dynamic weight generation system, techniques, and methods as presented in the various embodiments herein, improve the ability to match/distinguish signal sets with respect to those signal sets that do match. Further, the constant k selection can be tailored for each function respectively. As previously mentioned, a matching between signal sets should increase when similarity score is approaching 1 and decrease when we are closer to 0.

Using the match delta as a mean to estimate the performance the following results are achieved:

$$P_c^{f_1} = \Delta_{match} + \Delta_{no\text{-}match} = 0.82$$

$$P_c^{f_2} = \Delta_{match} + \Delta_{no\text{-}match} = 1.17$$

$$P_c^{f_3} = \Delta_{match} + \Delta_{no\text{-}match} = 0.94$$

Specific values of k can also be reviewed. For example, no matter the value of k utilized in the third function $f_3$ the same score is achieved, e.g., per slope 610A. However, as shown, for the first and second functions $f_1$ and $f_2$, the respective slopes (e.g., 410A-n, 510A-n) will vary for the respective k utilized.

Reviewing the top delta for respective values of k, then:

$$f_1^{k=0.5} = 0.25$$

$$f_2^{k=40} = 0.5$$

$$f_3^{k=1} = 0.27$$

Selecting the slope, $$f(x) = \frac{h(x)}{e^{k \cdot g(x)}}$$

Selecting the value of k for these types of exponential functions (e.g., functions $f_1$, $f_2$, $f_3$ and similar) can have a large effect on the performance of a respective function/algorithm regarding the ability of the function to assist in determination of whether a match or no-match exists between respective attributes and data sets. Calculation of the delta between a match and a no-match enables verification of the respective function/algorithm. An optimal or near optimal value of k can be obtained via application of machine learning, artificial intelligence, reinforcement learning or potentially by a generic algorithm.

As shown in FIG. 1B, the data matching system 110 can output matched data M-DATA 172, wherein the attributes $ATT_{1A\text{-}n}$ in data 125 are matched with attributes $ATT_{2A\text{-}n}$ in data 132, wherein the proprietary data 125 is now associated with the mapped/translated standard attributes in standard data 132.

As further shown in FIG. 1B, in an embodiment, the data matching system 110 can further include a review component 175. When the matched data M-DATA 172 is generated, the accuracy with which the standard attributes $ATT_{2A\text{-}n}$ in data 132 were mapped to/translated from the proprietary attributes $ATT_{1A\text{-}n}$ in data 125 can be reviewed. For example, an engineer can review the mappings and in the event of the engineer determining the translations of the proprietary attributes $ATT_{1A\text{-}n}$ to the standard attributes $ATT_{2A\text{-}n}$ was performed with an acceptable level of accuracy, the mapped data M-DATA 172 can be distributed, e.g., to an external entity. Alternatively, in the event of the engineer determining the translations of the proprietary attributes $ATT_{1A\text{-}n}$ to the standard attributes $ATT_{2A\text{-}n}$ was performed with an unacceptable level of accuracy (e.g., data/attributes were matched when the data/attributes were unrelated), further review of the various components included in the data matching system 110 can be conducted to improve the translating accuracy of the data matching system 110. For example, the accuracy with which the parse component 140 extracted the proprietary attributes $ATT_{1A\text{-}n}$ can be reviewed. Further, application of the processes/functions 155A-n and/or the weights k 158A-n can be reviewed. And furthermore, the accuracy with which the matching component 170 ranked the translation of the proprietary attributes $ATT_{1A\text{-}n}$ to the standard attributes $ATT_{2A\text{-}n}$ can also be reviewed. As part of the review process, AI and ML at the review component 175 can be utilized to determine why the engineer (for example) questioned the accuracy of the various components (and respective subcomponents) included in data matching system 110 can be utilized to improve the translation accuracy of the data matching system 110. Any determinations by review component 175 can be applied to the respective components/subcomponents to improve the current/future accuracy of data matching system 110.

As shown in FIG. 1, the data matching system 110 can further include a computer system 180 comprising a processor 182 and a memory 184, wherein the processor 182 can execute the various computer-executable components, functions, operations, etc., presented herein. The memory 184 can be utilized to store the various computer-executable components, functions, processes, code, etc., as well proprietary data 125, standardized data 132, attributes $ATT_{1A\text{-}n}$ and $ATT_{2A\text{-}n}$, matching values $MAT_{1\text{-}n}$, processes 148A-n, functions 155A-n, weights k 158A-n, the dynamic values $D\text{-}MAT_{1\text{-}n}$, the static values $S\text{-}MAT_{1\text{-}n}$, matched data 172, and suchlike.

As further shown, the OCS 180 can include an input/output (I/O) component 186, wherein the I/O component 186 can be a transceiver configured to enable transmission/receipt of proprietary data 125, proprietary attributes $ATT_{1A\text{-}n}$, standard attributes $ATT_{2A\text{-}n}$, standard data 132, and suchlike, between the data matching system 110 and any external system(s) 199, e.g., a cellphone, a computer-based system, a "cloud-based" computer system, and suchlike. I/O component 186 can be communicatively coupled, via an antenna 187, to the remotely located system 199. Transmission of data and information between the data matching system 110 (e.g., via antenna 187 and I/O component 186) and the remotely located devices and systems can be via the signals 195A-n. Any suitable technology can be utilized to enable the various embodiments presented herein, regarding transmission and receiving of signals 195A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID), Near Field Communication (NFC) radio technology, and the like.

In an alternative embodiment, and while not shown, the data matching system 110 can be operating onboard a vehicle, and communicatively coupled to another system also located/operating onboard the vehicle, whereby communication can be via a vehicle-based computer network/communication bus such as FLEXRAY, Controller Area Network (CAN), Ethernet, Local Interconnect Network (LIN), and such. Accordingly, proprietary data 125 generated at a first data generation system (e.g., located onboard a vehicle, not shown) can be mapped to the attributes utilized by a second data system (not shown), enabling the raw data in the proprietary data 125 to be utilized by the second data system onboard the vehicle, hence data 125 can be shared by respective components and systems onboard the vehicle, even though the respective components and systems may be operating with disparate attributes.

In an embodiment, the OCS 180 can further include a human-machine interface (HMI) 188 (e.g., a display, a graphical-user interface (GUI)) which can be configured to present various information including proprietary data 125, standardized data 132, attributes $ATT_{1A\text{-}n}$ and $ATT_{2A\text{-}n}$, matching values $MAT_{1\text{-}n}$, processes 148A-n, functions 155A-n, weights k 158A-n, the dynamic values $D\text{-}MAT_{1\text{-}n}$, the static values $S\text{-}MAT_{1\text{-}n}$, matched data 172, and suchlike, regarding the respective data matching operations presented herein, etc., per the various embodiments presented herein. The HMI 188 can include an interactive display 189 to present the various information via various screens presented thereon, and further configured to facilitate input of information/settings/etc., regarding the data matching operations.

As used herein, the terms "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

As mentioned, the similarity component 145 can utilize the associated operations, functions, processes 148A-n which can utilize machine learning and reasoning techniques and technologies that employ probabilistic and/or statistical-based analysis to prognose or infer an action that a user desires to be automatically performed. The various embodiments presented herein can utilize various machine learning-based schemes for carrying out various aspects thereof. For example, a process for determining the standard attributes $ATT_{1A-n}$ corresponding to the proprietary attributes $ATT_{2A-n}$ can be facilitated via an automatic classifier system and process.

A classifier is a function that maps an input attribute vector, x=(x1, x2, x3, x4, xn), to a class label class (x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., attribute parsing by parse component 140, similarity matching by similarity component 145, generation of dynamic values by dynamic data component 150, and suchlike).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to predetermined criteria, a standard attribute $ATT_{2A-n}$ to assign to data in a proprietary dataset 125, based on the proprietary attributes $ATT_{1A-n}$ already assigned to the raw data in proprietary data 125, for example.

As described supra, inferences can be made, and operations performed, based on numerous pieces of information. For example, as attributes $ATT_{1A-n}$ and $ATT_{2A-n}$ are parsed and identified, with subsequent generation of static values $S\text{-}MAT_{1-n}$ and dynamic values $D\text{-}MAT_{1-n}$ by the respective components included in, or in communication with, the data matching system 110 and the information/data accumulates (e.g., in memory 184) regarding potential data matchings, and suchlike, the data 125 and data 132 can be analyzed to determine converging patterns such that inferences can be made regarding matching between the datasets 125 and 132.

Figure 2:
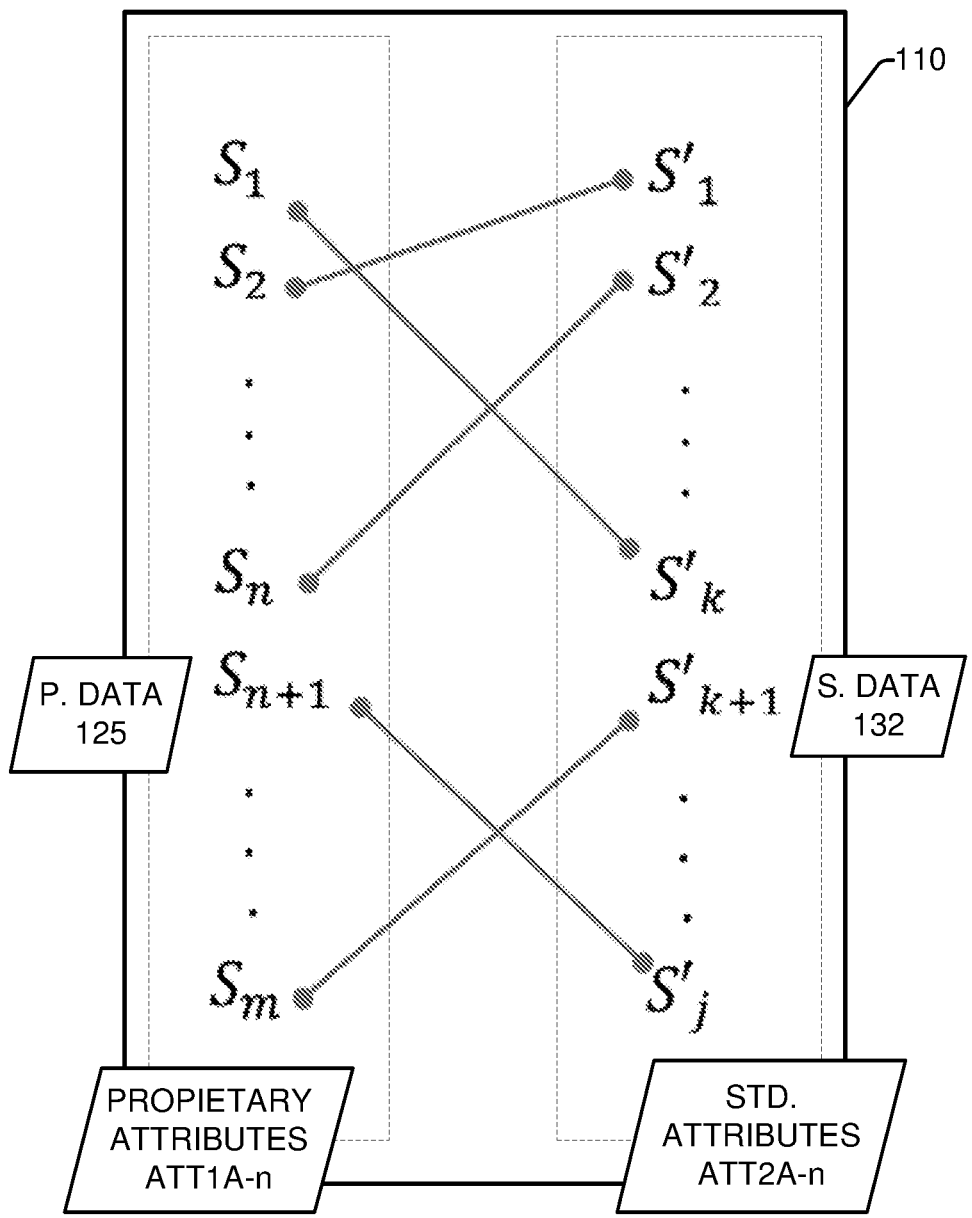
FIG. 2, presents a schematic illustrating a mapping operation being performed between a set of proprietary attributes and a set of available standard attributes, in accordance with an embodiment.

FIG. 2, schematic 200 illustrates a mapping operation being performed between a set of proprietary attributes and a set of available standard attributes, in accordance with an embodiment. As shown in FIG. 2, proprietary data 125 having proprietary attributes $ATT_{1A-n}$ is input into data matching system 110, and standard data 132 having standard attributes $ATT_{2A-n}$ is input into the data matching system 110. The respective attributes $ATT_{1A-n}$ and $ATT_{2A-n}$ can be parsed and based thereon, they can be matched/mapped. A static set of matched values $S\text{-}MAT_{1A-n}$ can be obtained. To assist with the mapping, a unique/important attribute (e.g., DESCRIPTION) can be identified, with a matched value $MAT_{1A-n}$ applied to a matching process (e.g., any of functions 155A-n), wherein the matched value can be an input value x into the matching process. Dynamic values $D\text{-}MAT_{1A-n}$ and static values $S\text{-}MAT_{1A-n}$ can be compared, wherein a degree of difference (delta) between the dynamic values $D\text{-}MAT_{1A-n}$ and static values $S\text{-}MAT_{1A-n}$ can be generated to indicate a degree of matching. Further, for the dynamic values $D\text{-}MAT_{1A-n}$ and static values $S\text{-}MAT_{1A-n}$ below 0.5, a poor match can be defined for these attributes and for the dynamic values $D\text{-}MAT_{1A-n}$ and static values $MAT_{1A-n}$ equal or above 0.5, a good match can be defined for these attributes.

Figure 3:
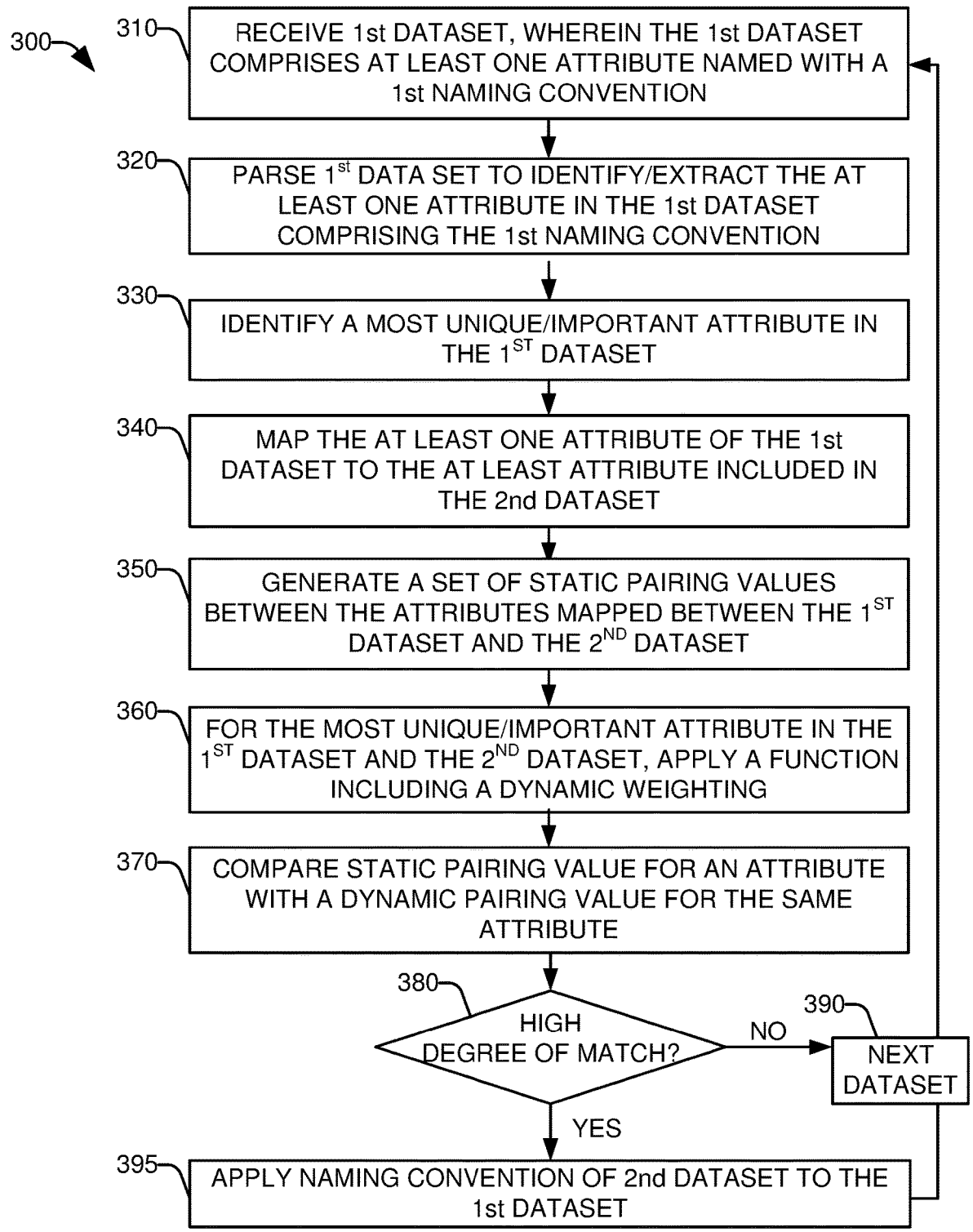
FIG. 3 illustrates a flow diagram for a computer-implemented methodology to determine a degree of matching between one or more attributes in a first set of data and one or more attributes in a second set of data, in accordance with at least one embodiment.

FIG. 3 illustrates a flow diagram 300 for a computer-implemented methodology to determine a degree of matching between one or more attributes in a first set of data and one or more attributes in a second set of data, in accordance with at least one embodiment.

At 310, a first dataset (e.g., data set 125) can be generated by a first data generation system (e.g., system 120). The first dataset can include two or more attributes (e.g., attributes $ATT_{1A-n}$) named in accordance with a first naming convention. The first dataset can be received at a data matching system (e.g., data matching system 110).

At 320, the first dataset can be parsed (e.g., by parse component 140) to identify/extract the two or more attributes (e.g., attributes $ATT_{1A-n}$) having the first naming convention.

At 330, the most important/unique attribute in the first dataset can be identified. Per the foregoing examples, the DESCRIPTION attribute has a higher degree of uniqueness and comprises a greater number of terms than the UNIT attribute.

At 340, a second dataset (e.g., data set 132) can be generated by a second data generation system (e.g., standardized system 130), whereby the second dataset can comprise two or more attributes (e.g., attributes $ATT_{2A-n}$). The two or more attributes in the first dataset can be mapped to/matched with the two or more attributes in the second dataset. The second dataset can be a known naming standard (e.g., VSS, COVISA) or the second dataset can comprise attributes that have been previously identified and the knowledge regarding the known attributes can be applied to the two or more attributes in the first dataset. The second dataset can be received at the data matching system (e.g., data matching system 110).

At 350, a set of paired matches $MAT_{1-n}$ can be generated (e.g., by similarity component 145), wherein the respective matches, e.g., $MAT_1$, $MAT_2$, . . . . $MAT_n$. indicate a measure of similarity between the respective attributes in $ATT_{1A-n}$ and $ATT_{2A-n}$. The matches $MAT_{1-n}$ can remain in a static form, e.g., $S\text{-}MAT_{1-n}$ for each respective pairing of attributes in $ATT_{1A-n}$ and $ATT_{2A-n}$.

At 360, for the attribute (e.g., DESCRIPTION) that was previously identified as being the most useful for matching determination, the matched value $MAT_B$ for that the most useful attribute can be applied to a matched value $MAT_n$ of the least important value UNIT. The matched value $MAT_B$ can be applied to the matched value $MAT_n$ utilizing a function (e.g., any of functions 155A-n) in conjunction with a constant k utilized to drive the function to 0 in the event of no match and 1 in the event of a high degree of similarity. Accordingly, the most important attribute can be utilized to generate a set of dynamically matched attributes $D\text{-}MAT_{1-n}$ with the low importance attribute weighted by the most important attribute.

At 370, the value of the static matched pairing value $S\text{-}MAT_{1-n}$ can be compared (e.g., by the matching component 170) with the value of the dynamic matched pairing value $D\text{-}MAT_{1-n}$. A difference (delta) between the value of the static matched pairing value $S\text{-}MAT_{1\text{-}n}$ is compared with the value of the dynamic matched pairing value, $D\text{-}MAT_{1\text{-}n}$, e.g., to give a degree of confidence in the respective $S\text{-}MAT_{1\text{-}n}$ and $D\text{-}MAT_{1\text{-}n}$ values (e.g., as generated by the similarity component 145 and the dynamic data component 150).

At 380, in response to a determination (e.g., by matching component 170) that NO, there is a low degree of matching, matching data $M\text{-}DAT_{1\text{-}n}$ can be generated (e.g., by matching component 170) wherein the matching data $M\text{-}DAT_{1\text{-}n}$ can include an indication that the first dataset (e.g., data 125) and the second dataset (e.g., data 132) are dissimilar. Methodology 300 can advance to 390, wherein the next pair of datasets can be reviewed, with methodology 300 returning to 310.

At 380, in a determination that YES, there is a high degree of matching, methodology 300 can advance to 395, wherein the matched data $M\text{-}DAT_{1\text{-}n}$ can be generated (e.g., by the matching component 170), wherein the attributes in the first dataset (e.g., attributes $ATT_{1A\text{-}n}$) can be labelled with a match to the known attributes in the second dataset (e.g., attributes $ATT_{2A\text{-}n}$).

Per the foregoing, two datasets (e.g., datasets 125 and 132) can be input into a data matching system 110, and based on the various components and functions presented herein, a set of match values M-DATA 172 can be automatically generated indicating the degree of match between the two datasets with a higher degree of confidence than can be achieved by a matching system that utilizes only static match values.

Example Operating Environment and Scenarios

Figure 7:
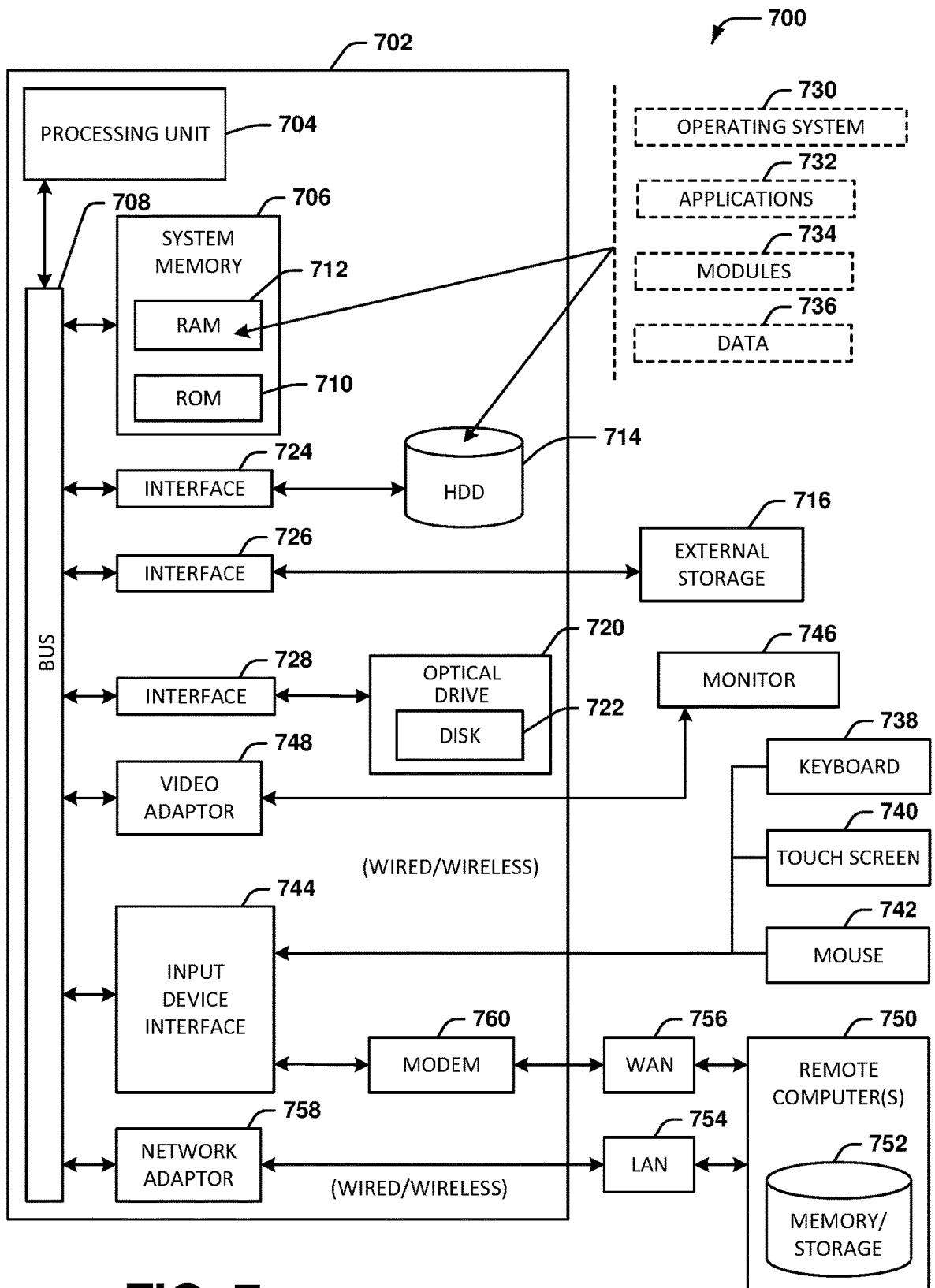
FIG. 7 is a block diagram illustrating an example computing environment in which the various embodiments described herein can be implemented.
Figure 8:
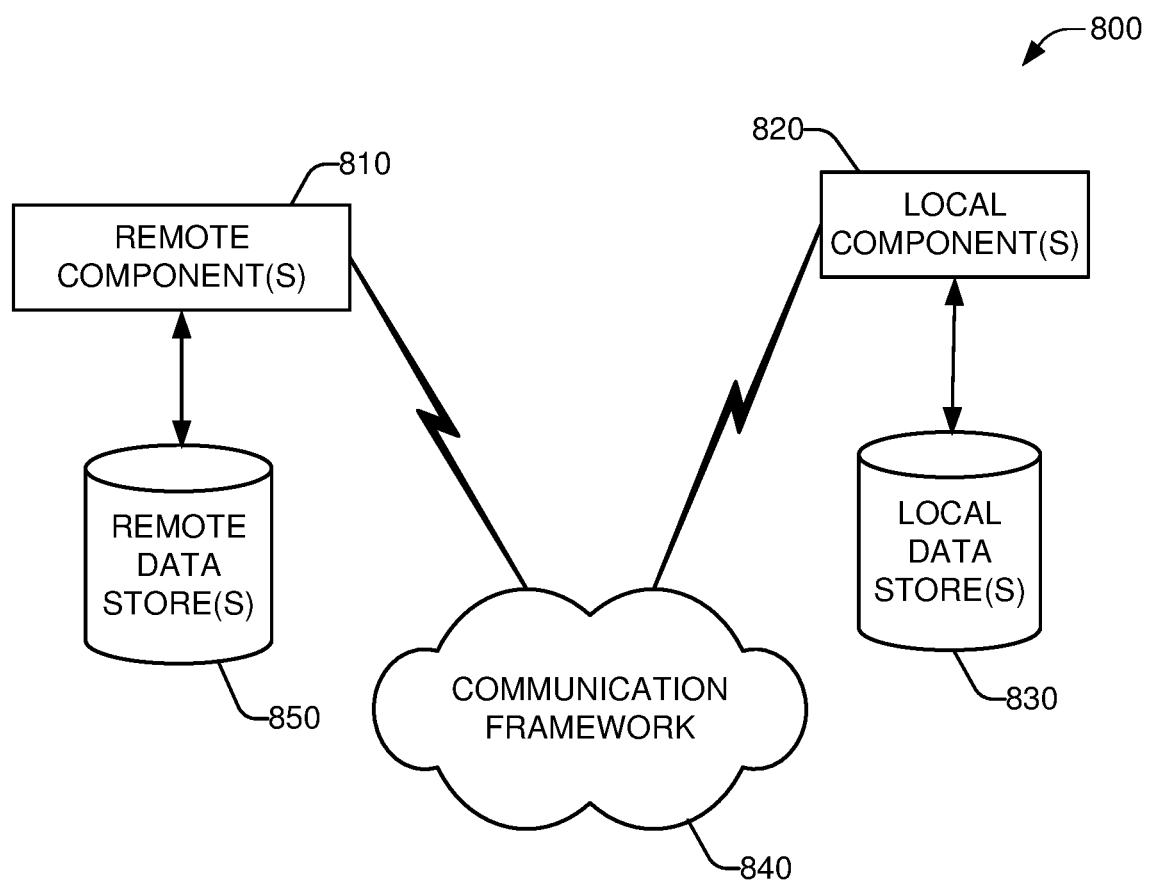
FIG. 8 is a block diagram illustrating an example computing environment with which the disclosed subject matter can interact, in accordance with an embodiment.

Turning next to FIGS. 7 and 8, a detailed description is provided of additional context for the one or more embodiments described herein with FIGS. 1-6C.

In order to provide additional context for various embodiments described herein, FIG. 7 and the following discussion are intended to provide a brief, general description of a suitable computing environment 700 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infra-red and other wireless media.

With reference again to FIG. 7, the example environment 700 for implementing various embodiments of the aspects described herein includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors and may include a cache memory. Dual microprocessors and other multi-processor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes ROM 710 and RAM 712. A basic input/output system (BIOS) can be stored in a non-volatile memory such as ROM, erasable programmable read only memory (EPROM), EEPROM, which BIOS contains the basic routines that help to transfer information between elements within the computer 702, such as during startup. The RAM 712 can also include a high-speed RAM such as static RAM for caching data.

The computer 702 further includes an internal hard disk drive (HDD) 714 (e.g., EIDE, SATA), one or more external storage devices 716 (e.g., a magnetic floppy disk drive (FDD) 716, a memory stick or flash drive reader, a memory card reader, etc.) and an optical disk drive 720 (e.g., which can read or write from a CD-ROM disc, a DVD, a BD, etc.). While the internal HDD 714 is illustrated as located within the computer 702, the internal HDD 714 can also be configured for external use in a suitable chassis (not shown). Additionally, while not shown in environment 700, a solid-state drive (SSD) could be used in addition to, or in place of, an HDD 714. The HDD 714, external storage device(s) 716 and optical disk drive 720 can be connected to the system bus 708 by an HDD interface 724, an external storage interface 726 and an optical drive interface 728, respectively. The interface 724 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 712, including an operating system 730, one or more application programs 732, other program modules 734 and program data 736. All or portions of the operating system, applications, modules, and/or data can also be cached in the RAM 712. The systems and methods described herein can be implemented utilizing various commercially available operating systems or combinations of operating systems.

Computer 702 can optionally comprise emulation technologies. For example, a hypervisor (not shown) or other intermediary can emulate a hardware environment for operating system 730, and the emulated hardware can optionally be different from the hardware illustrated in FIG. 7. In such an embodiment, operating system 730 can comprise one virtual machine (VM) of multiple VMs hosted at computer 702. Furthermore, operating system 730 can provide runtime environments, such as the Java runtime environment or the .NET framework, for applications 732. Runtime environments are consistent execution environments that allow applications 732 to run on any operating system that includes the runtime environment. Similarly, operating system 730 can support containers, and applications 732 can be in the form of containers, which are lightweight, standalone, executable packages of software that include, e.g., code, runtime, system tools, system libraries and settings for an application.

Further, computer 702 can comprise a security module, such as a trusted processing module (TPM). For instance with a TPM, boot components hash next in time boot components, and wait for a match of results to secured values, before loading a next boot component. This process can take place at any layer in the code execution stack of computer 702. e.g., applied at the application execution level or at the operating system (OS) kernel level, thereby enabling security at any level of code execution.

A user can enter commands and information into the computer 702 through one or more wired/wireless input devices, e.g., a keyboard 738, a touch screen 740, and a pointing device, such as a mouse 742. Other input devices (not shown) can include a microphone, an infra-red (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 704 through an input device interface 744 that can be coupled to the system bus 708, but can be connected by other interfaces, such as a parallel port, an IEEE 1094 serial port, a game port, a USB port, an IR interface, a BLUETOOTH® interface, etc.

A monitor 746 or other type of display device can be also connected to the system bus 708 via an interface, such as a video adapter 748. In addition to the monitor 746, a computer typically includes other peripheral output devices (not shown), such as speakers, printers, etc.

The computer 702 can operate in a networked environment using logical connections via wired and/or wireless communications to one or more remote computers, such as a remote computer(s) 750. The remote computer(s) 750 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 752 is illustrated. The logical connections depicted include wired/wireless connectivity to a local area network (LAN) 754 and/or larger networks, e.g., a wide area network (WAN) 756. Such LAN and WAN networking environments are commonplace in offices and companies, and facilitate enterprise-wide computer networks, such as intranets, all of which can connect to a global communications network, e.g., the internet.

When used in a LAN networking environment, the computer 702 can be connected to the local network 754 through a wired and/or wireless communication network interface or adapter 758. The adapter 758 can facilitate wired or wireless communication to the LAN 754, which can also include a wireless access point (AP) disposed thereon for communicating with the adapter 758 in a wireless mode.

When used in a WAN networking environment, the computer 702 can include a modem 760 or can be connected to a communications server on the WAN 756 via other means for establishing communications over the WAN 756, such as by way of the internet. The modem 760, which can be internal or external and a wired or wireless device, can be connected to the system bus 708 via the input device interface 744. In a networked environment, program modules depicted relative to the computer 702 or portions thereof, can be stored in the remote memory/storage device 752. It will be appreciated that the network connections shown are example and other means of establishing a communications link between the computers can be used.

When used in either a LAN or WAN networking environment, the computer 702 can access cloud storage systems or other network-based storage systems in addition to, or in place of, external storage devices 716 as described above. Generally, a connection between the computer 702 and a cloud storage system can be established over a LAN 754 or WAN 756 e.g., by the adapter 758 or modem 760, respectively. Upon connecting the computer 702 to an associated cloud storage system, the external storage interface 726 can, with the aid of the adapter 758 and/or modem 760, manage storage provided by the cloud storage system as it would other types of external storage. For instance, the external storage interface 726 can be configured to provide access to cloud storage sources as if those sources were physically connected to the computer 702.

The computer 702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 8, an illustrative cloud computing environment 800 is depicted. FIG. 8 is a schematic block diagram of a computing environment 800 with which the disclosed subject matter can interact. The system 800 comprises one or more remote component(s) 810. The remote component(s) 810 can be hardware and/or software (e.g., threads, processes, computing devices). In some embodiments, remote component(s) 810 can be a distributed computer system, connected to a local automatic scaling component and/or programs that use the resources of a distributed computer system, via communication framework 840. Communication framework 840 can comprise wired network devices, wireless network devices, mobile devices, wearable devices, radio access network devices, gateway devices, femtocell devices, servers, etc.

The system 800 also comprises one or more local component(s) 820. The local component(s) 820 can be hardware and/or software (e.g., threads, processes, computing devices). In some embodiments, local component(s) 820 can comprise an automatic scaling component and/or programs that communicate/use the remote resources 810 and 820, etc., connected to a remotely located distributed computing system via communication framework 840.

One possible communication between a remote component(s) 810 and a local component(s) 820 can be in the form of a data packet adapted to be transmitted between two or more computer processes. Another possible communication between a remote component(s) 810 and a local component(s) 820 can be in the form of circuit-switched data adapted to be transmitted between two or more computer processes in radio time slots. The system 800 comprises a communication framework 840 that can be employed to facilitate communications between the remote component(s) 810 and the local component(s) 820, and can comprise an air interface, e.g., Uu interface of a UMTS network, via a long-term evolution (LTE) network, etc. Remote component(s) 810 can be operably connected to one or more remote data store(s) 850, such as a hard drive, solid state drive, SIM card, device memory, etc., that can be employed to store information on the remote component(s) 810 side of communication framework 840. Similarly, local component(s) 820 can be operably connected to one or more local data store(s) 830, that can be employed to store information on the local component(s) 820 side of communication framework 840.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "client entity," "consumer," "client entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising:
   a memory that stores computer executable components; and
   a processor that executes at least one of the computer executable components that:
   determines, from a group of vehicle signal datasets, a degree of matching between a first vehicle signal dataset of a first vehicle from the group of vehicle signal datasets and a second vehicle signal dataset of a second vehicle from the group of vehicle signal datasets, wherein the first vehicle signal dataset is in a first format, wherein the second vehicle signal dataset is in a second format that is different from the first format, wherein the degree of matching is based on a similarity of two or more attributes in the first vehicle signal dataset with two or more attributes in the second vehicle signal dataset, wherein the two or more attributes in the first vehicle signal dataset are known, and wherein the determining the degree of matching comprises:
   identifying, in the two or more attributes in the first vehicle signal dataset, a first attribute having a most importance that is indicative of high confidence in the determination of degree of matching and a second attribute having a least importance that is indicative of a low confidence in the determination of the degree of matching,
   determining a first degree of similarity between a first attribute in the second vehicle signal dataset with the first attribute in the first vehicle signal dataset,
   determining a second degree of similarity between a second attribute in the second vehicle signal dataset with the second attribute in the first vehicle signal dataset, and
   applying the second degree of similarity to the first degree of similarity to dynamically adjust the first degree of similarity as a function of the second degree of similarity; and
   mapping, based on determining the degree of matching, one or more signals in the first vehicle signal dataset to respective one or more signals in the second vehicle signal dataset.

2. The system of claim 1, wherein the at least one of the computer executable components further:
   identifies, in the two or more attributes in the second vehicle signal dataset, the first attribute in the second vehicle signal dataset having at least one of a number of terms or form of terms similar to the first attribute in the first vehicle signal dataset.

3. The system of claim 1, wherein the at least one of the computer executable components further:
   identifies, in the two or more attributes in the second vehicle signal dataset, the second attribute in the second vehicle signal dataset having at least one of a number of terms or form of terms similar to the second attribute in the first vehicle signal dataset.

4. The system of claim 1, wherein the at least one of the computer executable components further:
   combines the adjusted first degree of similarity to the second degree of similarity to generate a match value between the first vehicle signal dataset and the second vehicle signal dataset.

5. The system of claim 4, wherein the at least one of the computer executable components further:
   compares the match value with a threshold; and
   in the event of the match value is below the threshold, indicates the first vehicle signal dataset and the second vehicle signal dataset do not match.

6. The system of claim 5, wherein the at least one of the computer executable components further:
   in the event of the match value is above the threshold, indicates the first vehicle signal dataset and second vehicle signal dataset match.

7. The system of claim 1, wherein the first attribute includes a greater number of terms than the second attribute.

8. The system of claim 1, wherein the first attribute is a DESCRIPTION and the second attribute is UNIT.

9. The system of claim 1, wherein the first attribute is a multi-valued attribute and the second attribute is a single value attribute.

10. The system of claim 1, wherein the two or more attributes in the first vehicle signal dataset are named in accordance with a standardized naming convention and the two or more attributes in the second vehicle signal dataset are named in accordance with a proprietary naming convention.

11. A computer-implemented method comprising:
    determining, by a device comprising a processor, a degree of matching between a first vehicle signal dataset of a first vehicle from a group of vehicle signal datasets and a second vehicle signal dataset of a second vehicle from the group of vehicle signal datasets, wherein the first vehicle signal dataset is in a first format, wherein the second vehicle signal dataset is in a second format that is different from the first format, wherein the degree of matching is based on a similarity of two or more attributes in the first vehicle signal dataset with two or more attributes in the second vehicle signal dataset, wherein the two or more attributes in the first vehicle signal dataset are known, and wherein the determining the degree of matching comprises:
    identifying, in the two or more attributes in the first vehicle signal dataset, a first attribute having a most importance that is indicative of high confidence in the determination of the degree of matching and a second attribute having a least importance that is indicative of a low confidence in the determination of the degree of matching, determining a first degree of similarity between a first attribute in the second vehicle signal dataset with the first attribute in the first vehicle signal dataset, determining a second degree of similarity between a second attribute in the second vehicle signal dataset with the second attribute in the first vehicle signal dataset, and applying the second degree of similarity to the first degree of similarity to dynamically adjust the first degree of similarity as a function of the second degree of similarity; and mapping, based on determining the degree of matching, one or more signals in the first vehicle signal dataset to respective one or more signals in the second vehicle signal dataset.

12. The computer-implemented method of claim 11, wherein the first attribute is a DESCRIPTION and the second attribute is UNIT.

13. The computer-implemented method of claim 11, wherein the first attribute is a multi-valued attribute and the second attribute is a single value attribute.

14. The computer-implemented method of claim 11, wherein the two or more attributes in the first vehicle signal dataset are named in accordance with a standardized naming convention and the two or more attributes in the second vehicle signal dataset are named in accordance with a proprietary naming convention.

15. The computer-implemented method of claim 11, wherein the first attribute includes a greater number of terms than the second attribute.

16. The computer-implemented method of claim 15, further comprising:
identifying, by the device, in the two or more attributes in the second vehicle signal dataset, the first attribute in the second vehicle signal dataset having at least one of a number of terms or form of terms similar to the first attribute in the first vehicle signal dataset; and
identifying, by the device, in the two or more attributes in the second vehicle signal dataset, the second attribute in the second vehicle signal dataset having at least one of a number of terms or form of terms similar to the second attribute in the first vehicle signal dataset.

17. The computer-implemented method of claim 15, further comprising:
combining, by the device, the adjusted first degree of similarity to the second degree of similarity to generate a match value between the first vehicle signal dataset and the second vehicle signal dataset;
comparing, by the device, the match value with a threshold; and
in the event of the match value is below the threshold, indicating, by the device, the first vehicle signal dataset and the second vehicle signal dataset do not match; and
in the event of the match value is above the threshold indicating, by the device, the first vehicle signal dataset and the second vehicle signal dataset match.

18. A computer program product for determining degree of dataset matching, the computer program product comprising a computer readable storage medium having program instructions embodied therewith, the program instructions executable by a processor to cause the processor to:
determine a degree of matching between a first vehicle signal dataset of a first vehicle from a group of vehicle signal datasets and a second vehicle signal dataset of a second vehicle from the group of vehicle signal datasets, wherein the first vehicle signal dataset is in a first format, wherein the second vehicle signal dataset is in a second format that is different from the first format, wherein the degree of matching is based on a similarity of two or more attributes in the first vehicle signal dataset with two or more attributes in the second vehicle signal dataset, wherein the two or more attributes in the first vehicle signal dataset are known, and wherein the determining the degree of matching comprises:
identifying, in the two or more attributes in the first vehicle signal dataset, a first attribute having a most importance that is indicative of high confidence in the determination of the degree of matching and a second attribute having a least importance that is indicative of a low confidence in the determination of the degree of matching,
determining a first degree of similarity between a first attribute in the second vehicle signal dataset with the first attribute in the first vehicle signal dataset,
determining a second degree of similarity between a second attribute in the second vehicle signal dataset with the second attribute in the first vehicle signal dataset, and
applying the second degree of similarity to the first degree of similarity to dynamically adjust the first degree of similarity as a function of the second degree of similarity; and
mapping, based on determining the degree of matching, one or more signals in the first vehicle signal dataset to respective one or more signals in the second vehicle signal dataset.

19. The computer program product of claim 18, wherein the program instructions are further executable by the processor to cause the processor to:
identify in the two or more attributes in the second vehicle signal dataset, the first attribute in the second vehicle signal dataset having at least one of a number of terms or form of terms similar to the first attribute in the first vehicle signal dataset; and
identify in the two or more attributes in the second vehicle signal dataset, the second attribute in the second vehicle signal dataset having at least one of a number of terms or form of terms similar to the second attribute in the first vehicle signal dataset.

20. The computer program product of claim 18, wherein the program instructions are further executable by the processor to cause the processor to:
combine the adjusted first degree of similarity to the second degree of similarity to generate a match value between the first vehicle signal dataset and the second vehicle signal dataset;
compare the match value with a threshold; and
in the event of the match value is below the threshold, indicate the first vehicle signal dataset and the second vehicle signal dataset do not match; and
in the event of the match value is above the threshold indicate the first vehicle signal dataset and the second vehicle signal dataset match.

* * * * *